(12) United States Patent
Weichert et al.

(10) Patent No.: US 7,003,493 B2
(45) Date of Patent: Feb. 21, 2006

(54) DIRECT PAYMENT WITH TOKEN

(75) Inventors: Margaret M. Weichert, San Carlos, CA (US); John J. Mascavage, III, San Mateo, CA (US)

(73) Assignee: First Data Corporation, Englewood, CO (US)

( * ) Notice: Subject to any disclaimer, the term of this patent is extended or adjusted under 35 U.S.C. 154(b) by 140 days.

(21) Appl. No.: 10/350,153

(22) Filed: Jan. 22, 2003

(65) Prior Publication Data

US 2004/0143552 A1 Jul. 22, 2004

(51) Int. Cl.
*G06F 17/60* (2006.01)
*H04L 9/00* (2006.01)

(52) U.S. Cl. .............................. 705/39; 705/43; 705/44; 380/23; 380/24; 380/25; 235/379; 235/382

(58) Field of Classification Search .................. 705/44, 705/39; 235/379
See application file for complete search history.

(56) References Cited

U.S. PATENT DOCUMENTS

| 5,220,501 A | 6/1993 | Lawlor et al. |
| 5,699,528 A | 12/1997 | Hogan |
| 5,745,886 A | 4/1998 | Rosen |

(Continued)

FOREIGN PATENT DOCUMENTS

| EP | 0 949 596 A2 | 10/1999 |
| EP | 1 077 436 A2 | 2/2001 |
| WO | WO 00/22559 A1 | 4/2000 |
| WO | WO 00/46725 A1 | 8/2000 |
| WO | WO 00/54122 A2 | 9/2000 |
| WO | WO 00/87177 A2 | 11/2000 |
| WO | WO 00/79452 A2 | 12/2000 |
| WO | WO 01/04816 A1 | 1/2001 |
| WO | WO 02/05195 A1 | 1/2002 |

OTHER PUBLICATIONS

Mastercard International, *Secure Payment Application (SPA)*, downloaded from website http://www.mastercardintl.com.

Confinity, Inc., *PayPal.com, How PayPal.comWorks*, downloaded from website http://www.paypal.com/ on Feb. 7, 2000.

Idealab Company, *PayMe.com*, downloaded from website https://ssl.idealab.com/ on Feb. 16, 2000.

X.Com, *Do More with Your Money*, downloaded from website http://www.x.com.

Dotbank, *The Way to Send and receive Money on the Internet*, downloaded from website http://www.dotbank.com.

Transpoint, *The Way to Pay Online*, downloaded from website http://www.transpoint.com/ on Feb. 10, 2000.

*Primary Examiner*—James P. Trammell
*Assistant Examiner*—Daniel L. Greene
(74) *Attorney, Agent, or Firm*—Townsend and Townsend and Crew LLP

(57) ABSTRACT

According to the invention, a method for transferring funds from a sender to one or more recipients using a wide-area computer network is disclosed. In one step, transfer information is received from the sender with the wide area computer network to transfer credit to from the sender to a recipient. The transfer information includes at least an identifier and a credit amount. The identifier is generated by the sender. The identifier is unique to the recipient. It is determined if the transfer information is complete. A message is sent to the recipient. Transfer of a transfer amount related to the credit amount is paused based, at least in part, on the transfer information being incomplete. The transfer of the transfer amount is completed after the transfer information is complete.

24 Claims, 25 Drawing Sheets

U.S. PATENT DOCUMENTS

| | | | |
|---|---|---|---|
| 5,757,917 A | | 5/1998 | Rose et al. |
| 5,825,003 A | * | 10/1998 | Jennings et al. ............ 235/379 |
| 5,826,241 A | | 10/1998 | Stein et al. |
| 5,899,980 A | | 5/1999 | Wilf et al. |
| 5,909,492 A | | 6/1999 | Payne et al. |
| 5,949,044 A | | 9/1999 | Walker et al. |
| 5,999,625 A | * | 12/1999 | Bellare et al. ................ 705/64 |
| 6,012,048 A | * | 1/2000 | Gustin et al. ................ 705/39 |
| 6,029,150 A | | 2/2000 | Kravitz |
| 6,070,798 A | | 6/2000 | Nethery |
| 6,078,907 A | | 6/2000 | Lamm |
| 6,119,106 A | | 9/2000 | Mersky et al. |
| 6,122,625 A | | 9/2000 | Rosen |
| 6,128,603 A | | 10/2000 | Dent et al. |
| 6,131,811 A | | 10/2000 | Gangi |
| 6,189,787 B1 | | 2/2001 | Dorf |
| 6,246,996 B1 | | 6/2001 | Stein et al. |
| 6,263,446 B1 | | 7/2001 | Kausik et al. |
| 6,263,447 B1 | | 7/2001 | French et al. |
| 6,282,658 B1 | | 8/2001 | French et al. |
| 6,289,322 B1 | | 9/2001 | Kitchen et al. |
| 6,321,339 B1 | | 11/2001 | French et al. |
| 6,347,305 B1 | | 2/2002 | Watkins |
| 6,360,254 B1 | | 3/2002 | Linden et al. |
| 6,408,284 B1 | | 6/2002 | Hilt et al. |
| 2002/0139849 A1 | | 10/2002 | Gangi |

* cited by examiner

DIRECT PAYMENT WITH TOKEN

This application incorporates by reference U.S. patent application Ser. No. 10/045,633 filed on Oct. 26, 2001 in its entirety.

BACKGROUND OF THE INVENTION

The invention relates generally to funds transfers, and more particularly relates to transferring money between parties in a semi-automated or automated manner.

One party may wish to transfer money to herself, a counter party, or vice versa, for any of a variety of reasons. Frequently, a payor party owes a debt to a payee party. These debts could be reoccurring and for small amounts. For example, royalty checks can often be for such small amounts that the cost of printing and mailing the checks can significantly increase the cost of distributing these royalty checks.

There are many other reasons to regularly transfer funds. For example, many employers offer their employees direct deposit of paychecks. The employee provides account and routing information for a bank account to the employer. Paychecks are directed into one or more bank accounts in this way. In some cases, direct deposit is used for other purposes also.

BRIEF DESCRIPTION OF THE DRAWINGS

The present invention is described in conjunction with the appended figures.

Figure 1:
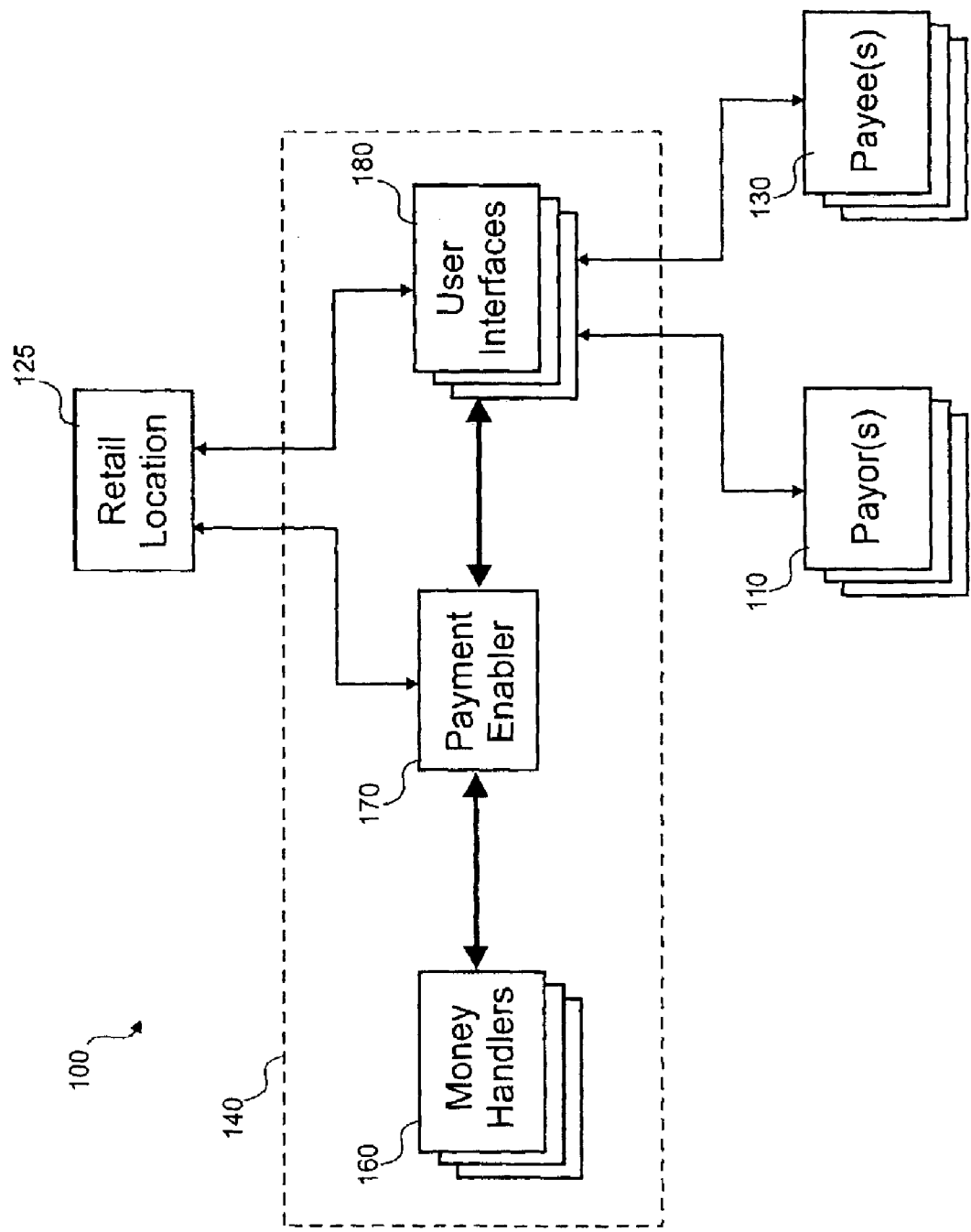
FIG. 1 is a block diagram of an embodiment of an online transfer system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION OF THE SPECIFIC EMBODIMENTS

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

In one embodiment, the present invention provides a method for transferring funds from a sender to one or more recipients using a wide-area computer network. In one step, transfer information is received from the sender with the wide area computer network to transfer credit from the sender to a recipient. The transfer information includes at least an identifier and a credit amount. The identifier is generated by the sender. The identifier is unique to the recipient. It is determined if the transfer information is complete. A message is sent to the recipient. Transfer of a transfer amount related to the credit amount is paused based, at least in part, on the transfer information being incomplete. The transfer of the transfer amount is completed after the transfer information is complete.

In another embodiment, the present invention provides a method for transferring funds from a sender to a plurality recipients using a wide-area computer network. In one step, transfer information is received from the sender with the wide area computer network to transfer credit from the sender to a number of recipients. The transfer information for one of the number of recipients includes at least an identifier and a credit amount. It is determined if the one is required to authenticate an identity of the one. A message is sent to the one. Transfer of a transfer amount related to the credit amount is paused based, at least in part, on whether the one is required to authenticate the identity. The transfer of the transfer amount is completed after any pause.

In yet another embodiment, the present invention provides a method for transferring funds from a sender to a plurality recipients using a wide-area computer network. In one step, transfer information is received from the sender with the wide area computer network to transfer credit from the sender to a number of recipients. The transfer information for one of the plurality of recipients includes at least an identifier and a credit amount. It is determined if the transfer information is complete for one of the number of recipients. It is also determined if the one is required to authenticate an identity of the one. A message is sent to the one. Transfer of a transfer amount related to the credit amount is paused based, at least in part, on at least a determination that either authentication or further transfer information is required. The transfer of the transfer amount is completed after any pause.

Initially referring to FIG. 1, a block diagram of an embodiment of an online transfer system 100 is shown. In this embodiment, a retail location 125 is coupled with a payment system 140. Payors 110 and payees interact with the payment system to transfer funds. Those funds could be in a variety of forms such as various currencies, monetary value, airline mileage, promotional program points, coupons, gift certificate credit, and commodities. Included in the payment system 140 are money handlers 160, a payment enabler 170 and user interfaces 180.

The retail location 125 is a physical location that allows interaction with the payment system 140. Typically, a clerk is available at the retail location 125 to assist a user 110, 130 to configure transfers, create accounts and receive payments. In some cases, a clerk is not needed to allow the user 110, 130 to interact with the payment enabler 140.

In this embodiment, automated payments are made from one or more payors 110 to one or more payees 130. There could be any number of payors 110 and payees 130. In a typical transaction, a payor 110 provides a transfer file to the payment system 140. They payment system 140 verifies the authenticity of the transfer file using secure sockets layer (SSL). The file could also be verified by checking the file once it is received by the payment system 140.

Each payee 130 is identified in the transfer file with a token in this embodiment. Other embodiments could use other unique identifiers such as e-mail address, phone number, government issued identification number, etc. The token contains information that references the merchant identifier assigned by the payment enabler 170 and a payee identifier assigned by the merchant. The payee identifier could be a customer number assigned by the merchant. The token could be encrypted or signed to allow verification of the token.

The payee 130 may interact with the payment enabler 170 through a number of merchants. In this embodiment, each merchant would have a different token for the payee 130. The payment enabler 170 may be able to correlate the various tokens by authenticating the identity of the payee 130. For example, if the name, address and government issued identifier matched for two tokens they could be automatically linked to an account of the payee 130.

Payors 110 transfer funds to payees 130. The payor 110 could be performing a single transfer with their file or a number of transfers. All users 110, 130 interact with the user interfaces 180 to configure and status the transfer. The users have accounts with banks, promotional programs, credit/debit cards, and gift certificate issuers. The accounts can fund the transfer or benefit from the proceeds of the transaction. The payment enabler 170 through the money handlers 160 accesses these accounts. The intricacies of posting debits and credits and clearing payments are performed by the money handlers 160. Various embodiments could have any number of payment handlers 160.

Figure 2:
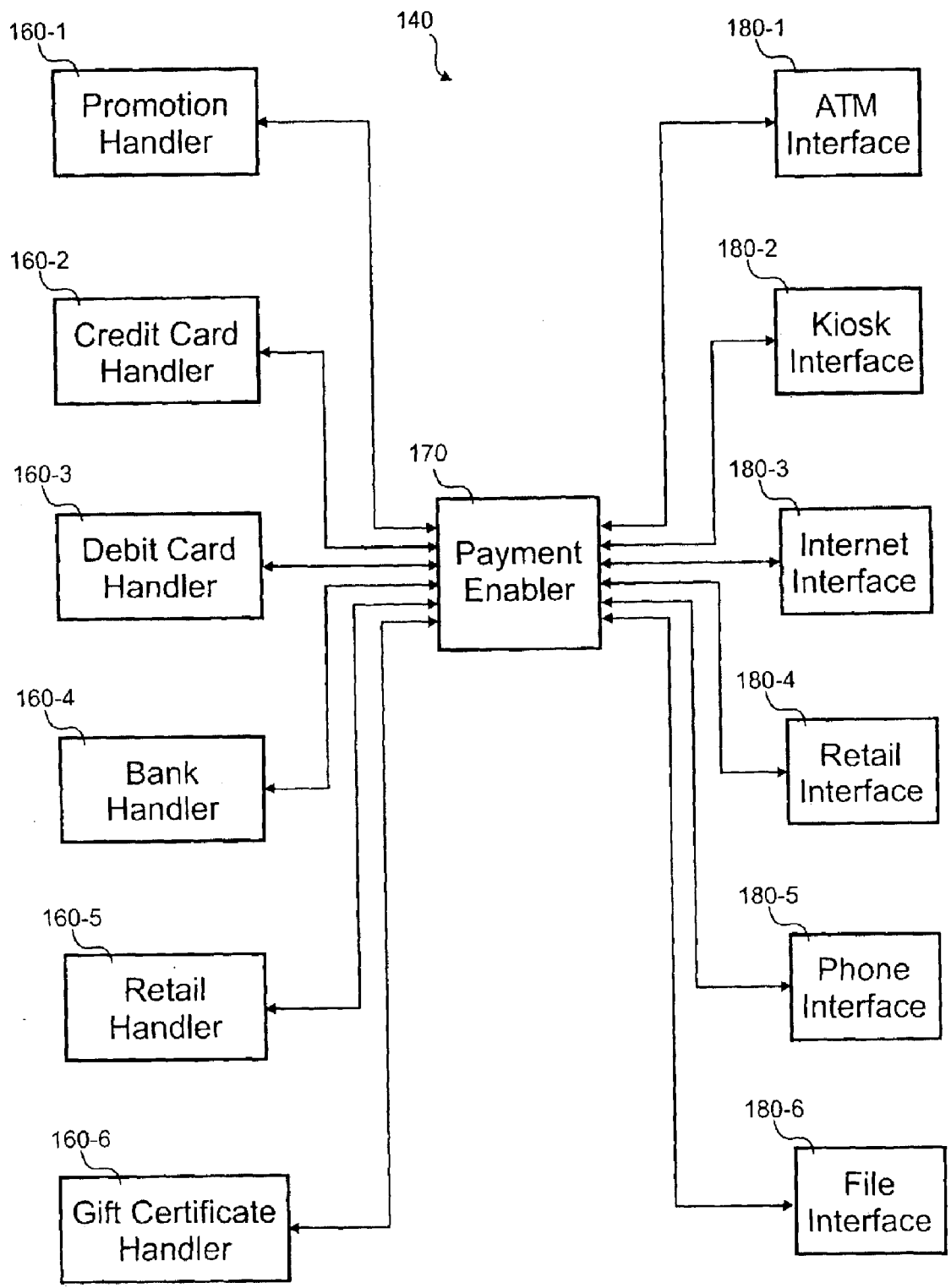
FIG. 2 is a block diagram of an embodiment of a payment system.

With reference to FIG. 2, a block diagram of an embodiment of a payment system 140 is shown. In this embodiment, six handlers 160 and six user interfaces 180 are shown. Other embodiments could have more or less handlers 160 and interfaces 180. Each of the handlers 160 allows a payor or payee 110, 130 to add and/or remove money from the payment enabler 170. Normally, the payee 130 can choose the handler 160, but in some circumstances, the payor 110 can choose the handler 160. For example, the payor may specify that only a bank handler 160-4 can be used to receive the funds from the payment enabler 170. The user interfaces 180 allow interaction with the payment enabler 170 to transfer money to and from a stored value fund or to configure automated transfers.

The promotion handler 160-1 allows adding and removing money in a form other than legal tender or a negotiable instrument. Examples include airline mileage programs and prepaid phone cards. For example, a user could use money in their stored value fund to purchase airline miles with an airline mileage handler 160-1 or miles could be transferred from a payor 110 to a payee 130. A conversion rate would be applied to convert the money to mileage credit. The promotion handler 160-1 would store any special information from the payment enabler 170, such as the payor's promotion account number, etc.

The credit and debit card handlers 160-2, 160-3 largely behave the same from the perspective of the user. Both can be used to add money into the payment enabler 170. In other embodiments, these handlers 160-2, 160-3 can also be used to remove money from the payment enabler 170 also, for example, to purchase a prepaid credit/debit card, to pay down a balance on a credit card, or to add credit to a bank account associated with a debit card. To use these handlers 160-2, 160-3, the payment enabler 170 stores the information for receiving money from credit or debit cards in the conventional way, such as the account number, expiration date, name, and/or PIN. Similar information may be used when paying-out money to a credit/debit card.

The bank handler 160-4 allows electronic funds transfer (EFT) of money to a bank account or brokerage account of the user. The user enters the account number and routing information into the payment enabler 170 with a user interface 180 to facilitate adding and removing of money from the payment enabler 170 with this handler 160-4. In one embodiment, an automated teller machine (ATM) could incorporate the bank handler 160-4 along with an ATM interface 180-1 to allow adding and removing funds along with interfacing with the payment enabler 170. Another embodiment uses a bank handler 160-4 branch location as a retail interface 180-4 for interacting with the payment enabler 170. Some embodiments could wire money into a bank account of the user instead of an EFT.

The retail handler 160-5 typically corresponds to a retail location 125 or a system of linked retail locations 125 that may wire money, print money orders and/or cash checks. Money may be sent to the retail handler 160-5, whereafter the user 130 is issued cash or a negotiable instrument for that money. Money can be added to the system 100 by the retail handler 160-5 also. For example, the user 110 may give cash, use a card, write a check to the agent who enters a credit into the payment enabler 170. The payor 110 could further specify a payee 130 to the agent who 130 should get the money along with any information on a destination account of the payee 130 that might be known to the payor 110. A retail interface 180-4 at the retail location 125 is used by the agent to indicate to the payment enabler 170 that the money has been received from or by the user 110, 130. Through a retail handler 160-5, a payor 110 could use the online transfer system 100 without any knowledge of computers or without any debit/credit card or bank account.

Gift certificates are dispensed through one or more gift certificate handlers 160-6. The gift certificate can be limited to merchandise and/or services from a single store or a group of stores. In some cases, the gift certificate is used only online by entering a code provided to the payee or could be printed for use in a bricks and mortar store. Multi-store gift certificates such as Flooz™, formerly available from Flooz.com, could also be provided to the payee 130.

As briefly discussed above, the ATM interface 180-1 allows interaction with the payment enabler 170. The user may 110, 130 or may not have an affiliation with the ATM that is used to interface with the payment enabler 170. Under this circumstance, the owner of the ATM may charge the user a fee for this service. The user 110, 130 can receive cash or deposit cash if the ATM is coupled to a bank handler 160-4. In any event, the ATM interface 180-1 can be used to interface with the payment enabler 170 in the same way a user 110, 130 may interact through a web browser and computer 120 with the payment enabler 170. If the ATM has a magnetic stripe or smart card reader, this could be used by to avoid entering credit or debit card information manually for the payment enabler 170.

A kiosk interface 180-2 allows a user to also interact with the payment enabler 170, but does not allow adding or removing cash in this embodiment. The kiosk interface 180-2 may be a browser terminal available for general use. Some embodiments may include a check or money order printer for removing money from the system 100. The kiosk interface 180-2 could be in a retail location 125 and linked to the other systems in the retail location 125 such that a payout could be provided by other systems in the retail location 125. For example, the agent could access the payment enabler 170 with a retail interface 180-3 to remove funds that are disbursed to the payee 130 from a cash register.

An Internet interface 180-3 is typically implemented through a web browser. The browser downloads web pages from the payment enabler 170. The Internet interface could be hosted by the computer of the user or any computer that can display web pages. Some embodiments could host the Internet interface on a portable device such as a wireless phone or personal digital assistant (PDA). The Internet interface 180-3 may also be used by the ATM, kiosk and retail interfaces 180-1, 180-2, 180-4 in whole or in part. The Internet interface 180-3 uses encryption for the link to the payment enabler 170 in some embodiments. Other embodiments may,not have a web interface, using application software instead to interact with the payment enabler 170.

The retail interface 180-4 allows for specialized interaction by an agent at the retail location 125. Agents typically have special training and offer enhanced services over most interfaces 180 and handlers 160. The agent can move money between payors 110 and payees 130. Also, the agent can pay-in and pay-out money from the online transfer system 100 or configure transfers between parties 110, 130. Files from removable media can be read into the system by the agent using the file interface 180-6. The retail interface 180-4 allows an agent to act on behalf of the user 110, 130 when manipulating the user's account. For security, the user's password or PIN may be entered by the user during this manipulation on a private keypad or terminal. Further, the agent may verify the identity of the payee 130 before disbursing the funds. In one embodiment, a test question is provided by the payor 110 that the payee 130 must answer before the electronic gift is paid-out. Alternatively, the payee 130 could confirm some not easily discernable information such as the maiden name of someone, a place of birth, a social security number, etc.

Interaction with the payment enabler 170 may also be performed over a telephone interfaced to the plain-old telephone system (POTS). The phone interface 180-5 provides voice prompts and recognizes the user's touch-tone or speech recognized input. Enhanced interaction with the phone interface 180-5 could be provided with wireless phones, smart phones or VOIP phones having wireless access protocol (WAP) and/or graphical user interfaces (GUIs).

The payment enabler 170 can receive files that list one or more transfers. These files are transferred from the various payors 110 in a secure manner that authenticates the payor and prevents unauthorized modification. The files could be transferred using standard file transfer protocol (FTP) protected by secure sockets layer (SSL) or other ways. Each file contains information to identify the payor, payee, transfer amount, any target account information, any demographic information on the payee, etc. Upon receipt of the file, the payment enabler 170 begins preparations to perform the indicated transfers.

Figure 3:
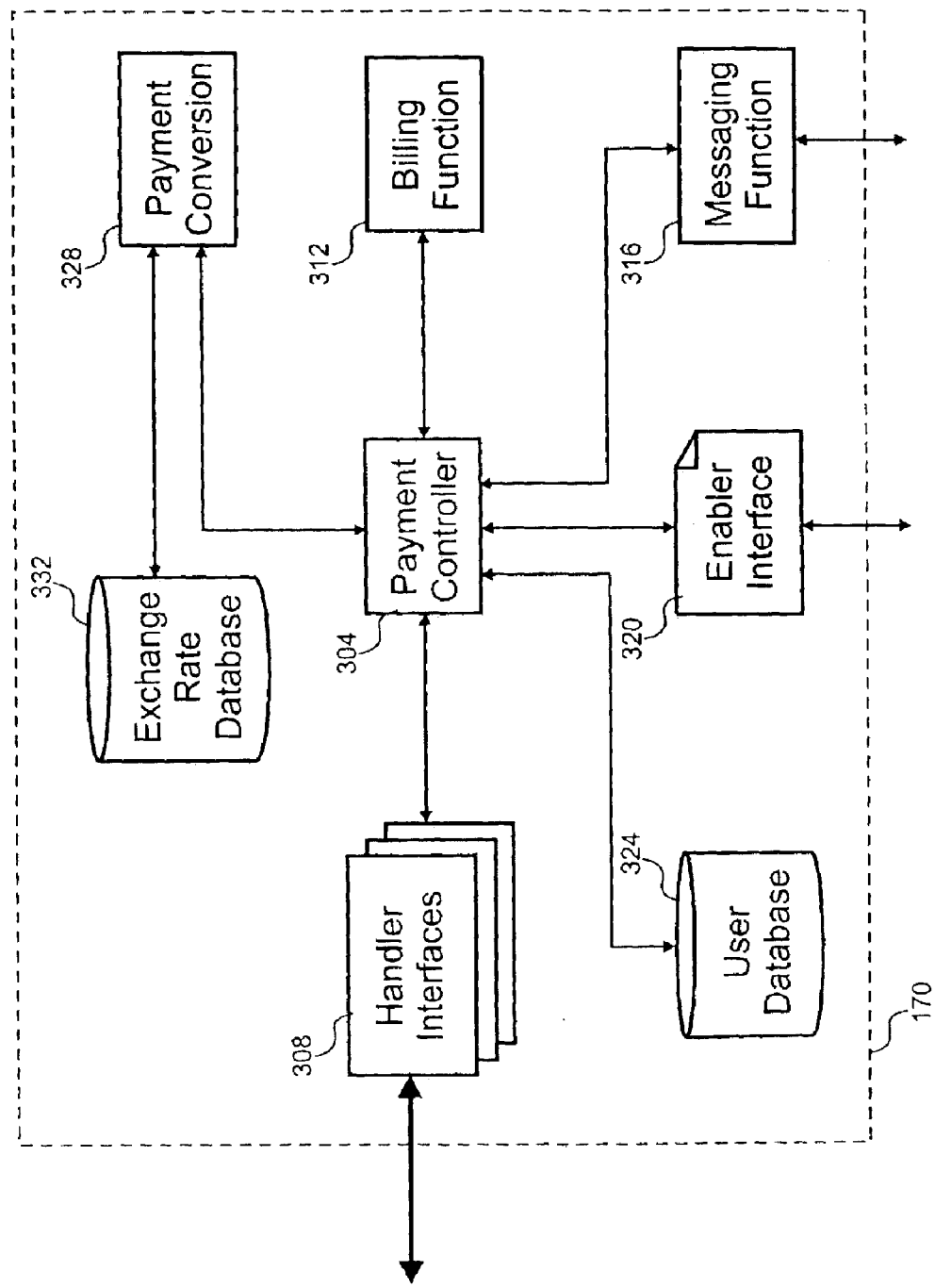
FIG. 3 is a block diagram of an embodiment of a payment enabler.

Referring to FIG. 3, a block diagram of an embodiment of a payment enabler 170 is shown. The transfer of money between handlers 160, stored value funds and users 110, 130 is controlled by the payment enabler 170 in this embodiment. The payment enabler 170 may be implemented on one or more computers in one or more locations where the various computers would communicate over a network of some sort. Included in the payment enabler 170 are a payment controller 304, handler interfaces 308, a billing function 312, a messaging function 316, an enabler interface 320, a user database 324, a payment conversion function 328, and an exchange rate database 332.

The payment controller 304 manages operation of the payment enabler 170. The handlers 160 and interfaces 180 along with user information and money conversion tasks are all choreographed by the payment controller 304. The payment controller 304 is interconnected to the other portions of the payment enabler 170 by one or more networks.

The payment conversion function 328 allows converting between disparate forms of money as it is transferred through the transfer system 190. An exchange rate database 332 holds conversion factors that allow determining the proper weight to give one form of money with respect to the others. In one example, the payment conversion function 328 may convert money in U.S. dollars to money in European Union Euros. In another example, a user may convert money into airline miles of eight miles for every dollar for a promotion handler 160-1. The exchange rate database 332 is updated with conversion rates as often as practical to track changes in currency values. The conversion rate may accommodate a percentage service fee for the exchange, or instead of a conversion rate, a flat fee could be charged. In some embodiments, the conversion rate incorporates a service fee.

The billing function 312 monitors and charges for the services of the payment enabler 170. There may be charges when transferring money, converting money, redirecting a transfer, opening accounts, using customer service, sending electronic gifts, printing and mailing negotiable instruments, using kiosks, ATMs or retail locations, etc. These charges are normally deducted from a transfer, but other embodiments could charge monthly fees or charge a fee to the payor 110 or payee 130 in addition to the amount transferred. Some embodiments could recover a fee from the handler 160, for example, a fee could be charged to the gift certificate target store instead of charging the payor 110. The different types of handlers 160 may have different fees associated with them. For example, a credit card may have a three percent charge, but a bank transfer may only have a one percent charge. The payor 110 and/or the payee 130 can be charged to transfer money between themselves. The transfer in or out of the system 100 may incur a separate charge. The billing function 312 may issue, or otherwise make available, invoices for some users 110, 130.

There are handler interfaces 308 to support the various types of handlers 160. Each of these interfaces 308 may support a single handler 160 or a group of handlers. For example, a single interface 308 may perform EFT both to and from all bank handlers 160. When money is sent to or received from a handler 160, the appropriate handler interface 308 passes the money and transfer information to the payment controller 304. In some embodiments, the cost of the transfer to or from the handler 160 is reported by the handler interface 308 such that the billing function can recover those costs.

Information for the users of the system 100 is stored in the user database 324. This information includes an address book of other users, money credit in the stored value fund, past money transfer information, account number, e-mail addresses, demographic information, handler interface information, handler preference information, etc. In this embodiment, the demographic information includes name, address, phone number(s), a government issued identification number such as a social security number, and other information. Any money credit not transferred out of the system 100 is stored in a trust account for the benefit of the user according to the entry in the user database 324 corresponding to that user and interest may or may not be paid on that money credit.

The enabler interface 320 is used by the various interfaces 180 to interact with the user or their agent. The enabler interface 320 allows the user 110, 130 to create and maintain their account, transfer money, configure handlers, and learn to use the system 100. The appropriate user interface 180 formats and processes the enabler interface information according to the device used to interface with the payment enabler 170. In other words, the various handler interfaces 180 interact with the enabler interface 320 to translate information suitable for the particular handler interface 180. For example, the enabler interfaces may want certain demographic information to create an account that the phone interface 180-5 would convert to verbal questions. In another example, the Internet interface 180-3 takes the information from the enabler interface 320 and formats into hypertext mark-up language (HTML) appropriate for the web browser of the user 110, 130.

A messaging function 316 is used with some configurations to notify the user of certain events. Status, acknowledgment and billing messages are sent by the messaging function 316. For example, a transfer not clearing could be sent to the payor 110 such that another payment option could be used to fund the transfer. These messages could be accessed using a web browser, an e-mail program, an instant messaging program, a voice mail system, a pager, a WAP enabled device, etc. In some embodiments, the messaging function 316 may issue printed bills and statements for users 110, 130. The messaging function 316 is also used to communicate with retail locations 125 in various embodiments.

Figure 4:
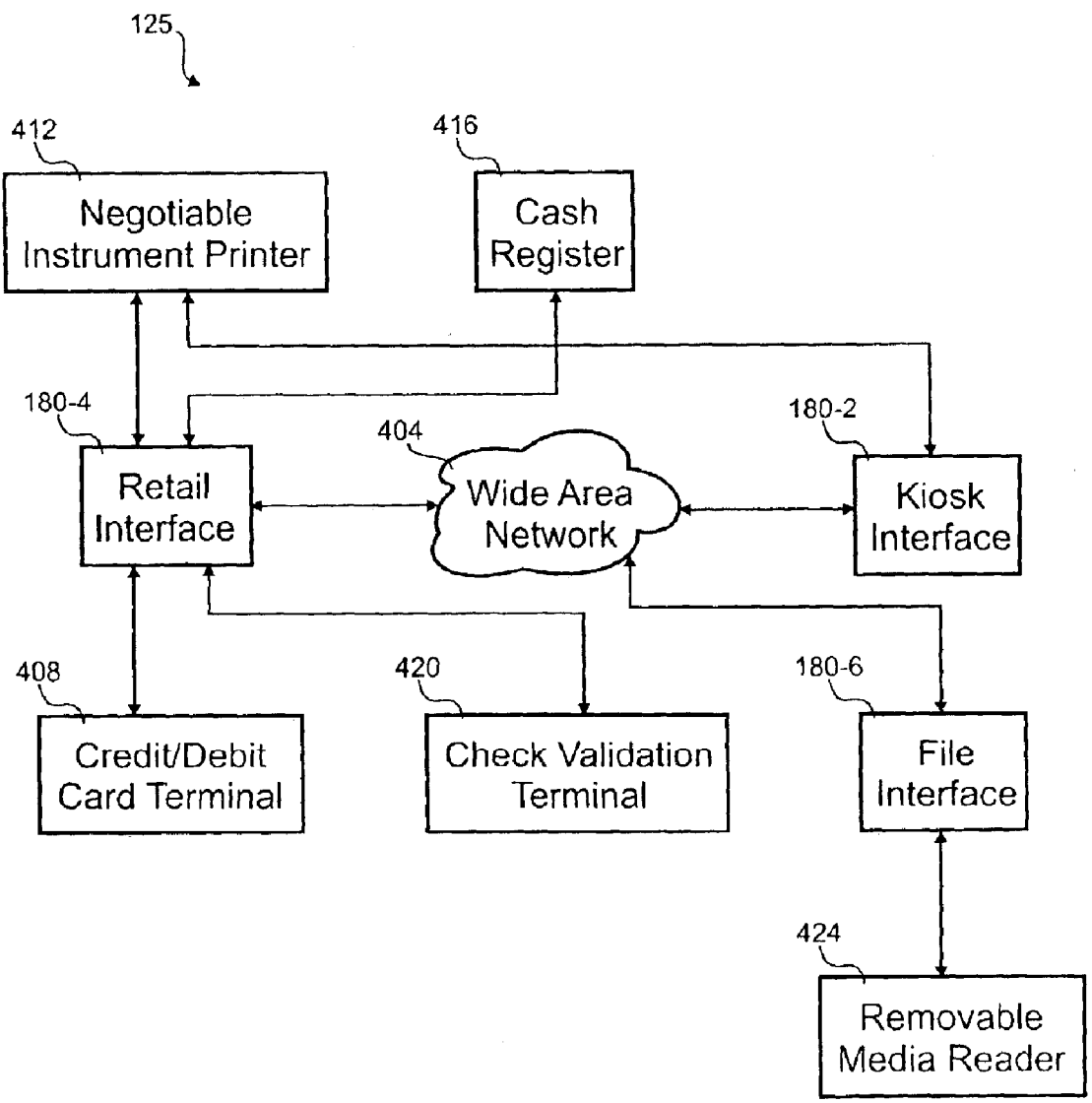
FIG. 4 is a block diagram of an embodiment of a retail location.

Referring to FIG. 4, a block diagram of an embodiment of a retail location 125 is shown along with associated enabler interfaces 180. The retail, kiosk and file interfaces 180-2, 180-4, 180-6 are coupled to a wide area network 404 that is coupled to the payment enabler 170. The retail location 125 may be used as a retail money handler 160-5 to accept and disperse money in the form of check, money order, cash, gift certificate, etc. In this embodiment, the retail location 125 is part of a network of retail locations that allow the users 110, 130 to choose from among those retail locations 125 when interacting with the system 100.

The kiosk interface 180-2 is primarily intended for users to interact with, and the retail interface 180-4 is primarily intended for agents to interact with. In some embodiments, both interfaces 180-2, 180-4 are used to perform a transfer and/or gift purchase. For example, the agent may use the retail interface 180-4 to perform the transfer while the kiosk interface 180-2 is used to monitor the agent's actions and enter a password or PIN that is kept secret from the agent. The kiosk interface 180-2 may also be used to perform a complete transfer in circumstances where the user 110, 130 wants to use the system 100, but does not want or is not trained to use the other interfaces 180.

The retail location 125 includes a removable media interface 424 to accept files with transfer information from a payor 110. The removable media interface 424 recognizes the popular formats of removable media and could be updated to support new format. For example, the removable media interface 424 supports optical disks, floppy disks, flash memory cards, portable hard drives, etc. The file interface 180-6 receives the file(s) read by the portable media to initiate one or more transfers and provide other information on the payor 110 and payees 130.

The retail interface 180-4 and kiosk interface 180-2 can output a negotiable instrument with a printer 412. Examples of negotiable instruments include money orders, cashiers checks, tellers checks, certified checks, checks, gift certificates, coupons, etc. In some embodiments, each interface 180-2, 180-4 may have a separate printer. The printer 412 may also be used to print receipts and messages related to the transfer of money.

Money can be added to or removed from the system 100 at the retail location 125 with money access devices 408, 416, 420. In the conventional manner, cash can be received by the cash register, credit or debit cards and be debited by the card terminal 408, and checks can be confirmed with a check validation terminal 420. Cash can be paid out from the cash register 416 or added to a credit or debit card by the card terminal 408 in a conventional fashion. These monkey distribution devices 408, 416, 420 all interface with the system 100 by way of the retail interface 180-4 such that pay-outs and pay-ins can be automatically recorded by the payment enabler 170.

Figure 5A:
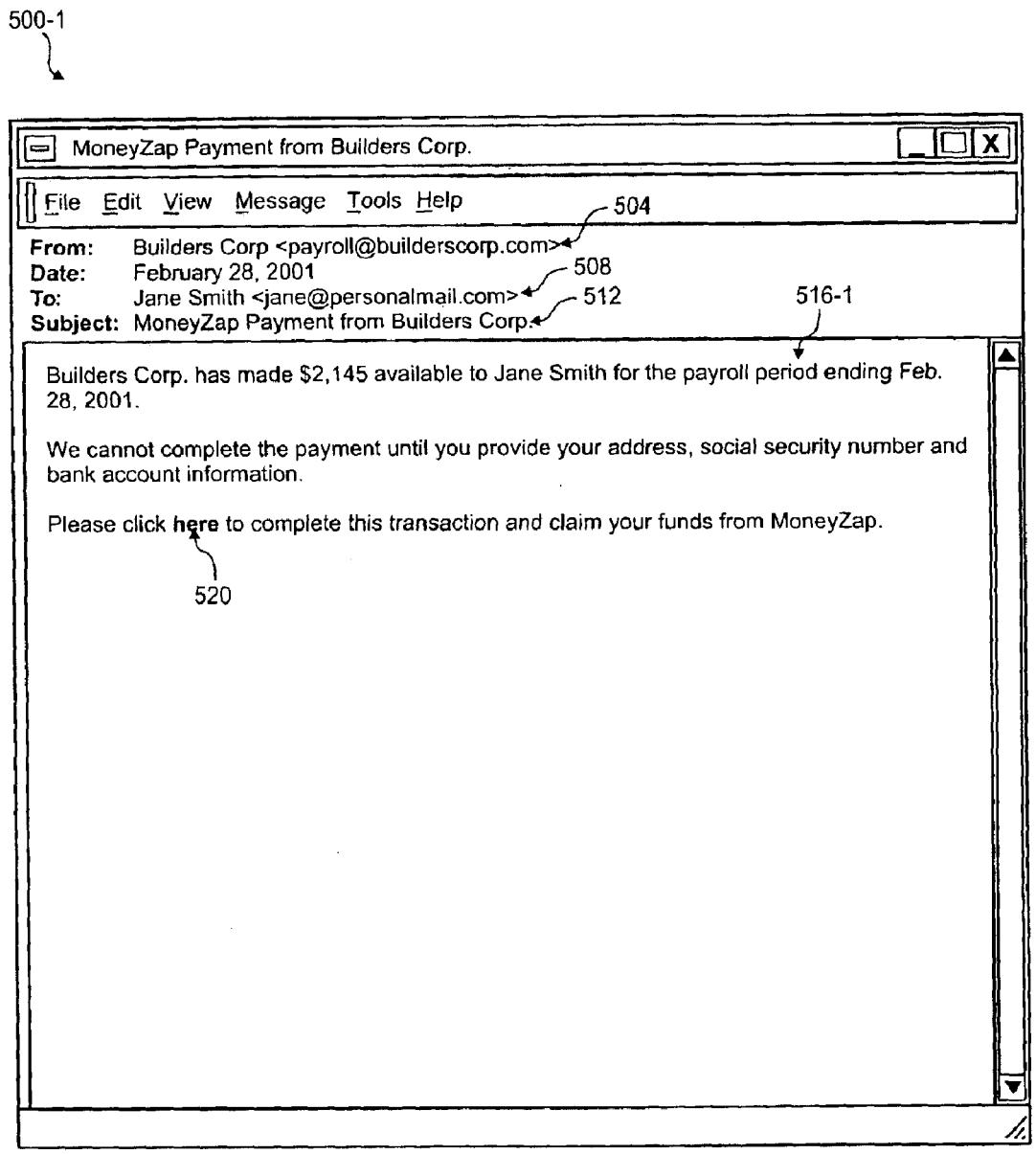
FIG. 5A is a screen shot of an embodiment of a transfer message that requests further information from the payee.

With reference to FIG. 5A, a screen shot of an embodiment of a transfer message 500-1 is shown that requests further information from the payee 130. This message could be sent by the messaging function 316 although it appears to have come from the payor 110. Because of this, any responses to the transfer message 500-1 will be directed to the payee 130. The transfer message 500-1 has a sender address 504, a receiver address 508, a subject 512, and a message payload 516-1. A payment enabler link 520 allows easily opening a web browser window to the Internet interface 180-3.

In some cases, the e-mail address of the payee 130 is incorrect or invalid. Where an error message is received by at the sender address 504, the payor 110 can reverse the transfer. When the payee 130 logs in to claim the funds, identity is authenticated to assure proper receipt of the funds.

In some embodiments, the payee 130 is asked to confirm the transfer and/or provide any missing information requested by the payment enabler 170 to complete the transfer. In some embodiment, the payee 130 only has to confirm the first transfer before the information is used for all future transfers. This embodiment of the message payload 516-1 solicits the payee 130 to visit the payment enabler 170 by way of the Internet interface 180-3 to enter missing information. In this example, the payor 110 only had the name and e-mail address of the payee 130. The payee 130 follows the payment enabler link 520 to enter the missing address, government issued identifier code and bank account information. The payment enabler link 520 could include the token or some other code to uniquely identify the payee 130 such that forms could be prepopulated with any preexisting information.

Figure 5B:
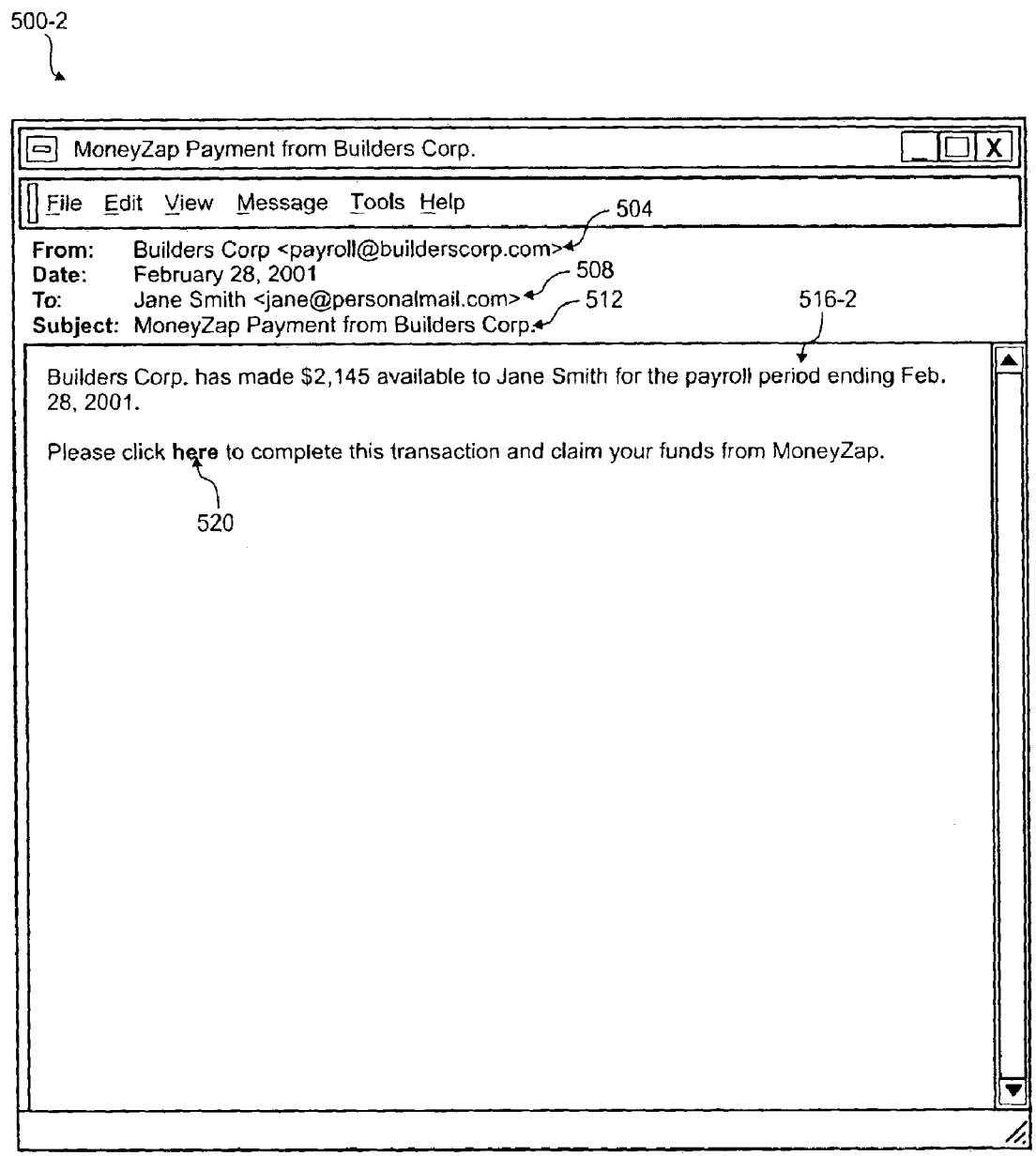
FIG. 5B is a screen shot of another embodiment of the transfer message that ask the payee to log into the payment enabler to claim his or her funds.

Referring next to FIG. 5B, a screen shot of another embodiment of the transfer message 500-2 is shown that ask the payee 130 to log into the payment enabler 170 to claim the funds being transferred. In this embodiment, the payee 130 creates an account with the payment enabler 170 or already has an account. The message payload 516-2 links to a fund claim window where the payee 130 can log into the payment enabler 170 to claim the funds and determine the payout method to use. The unclaimed funds wait in a stored value fund until claimed by the payee 130. If unclaimed for a period of time, the funds could revert back to the payor 110.

Figure 5C:
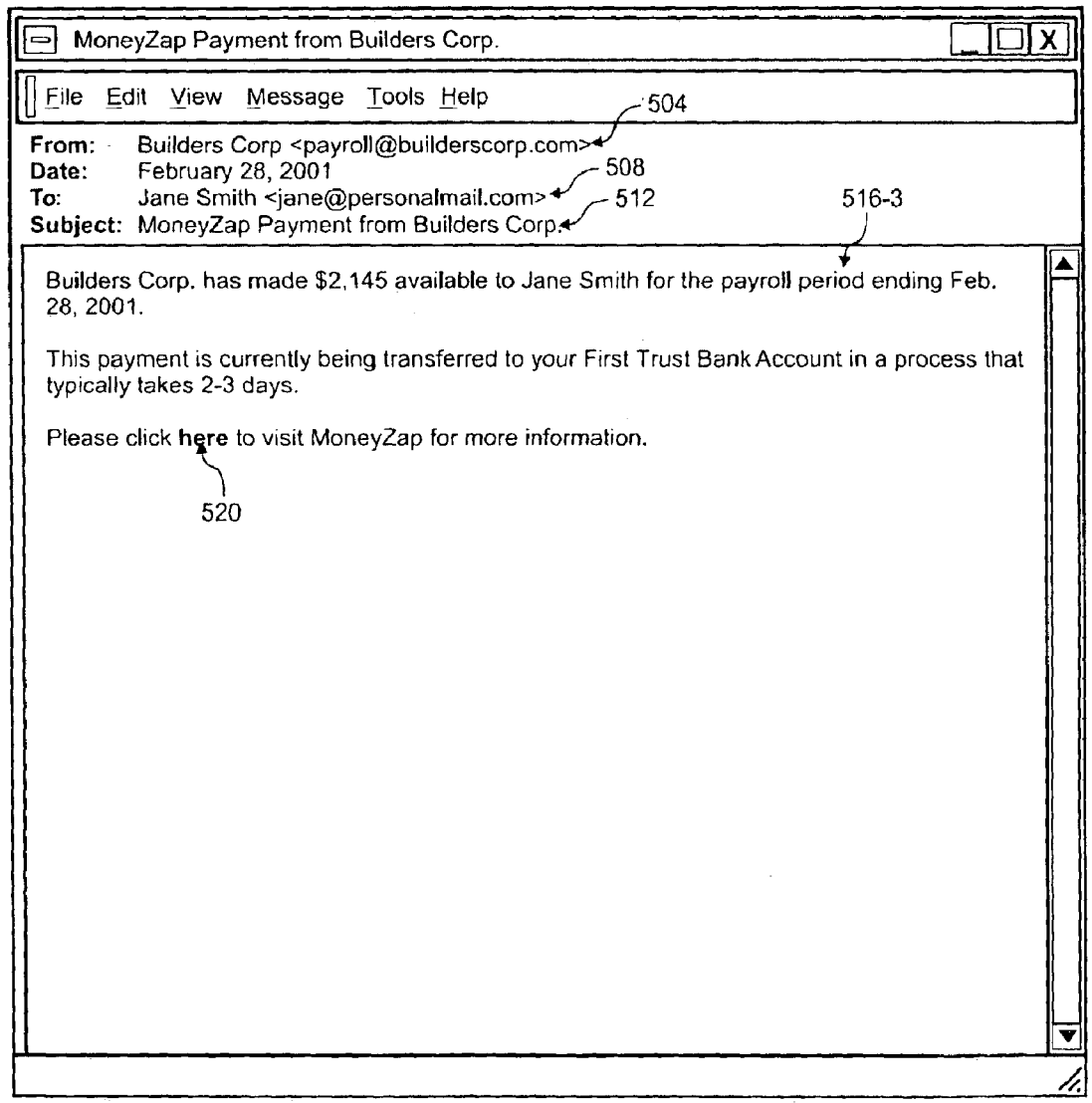
FIG. 5C is a screen shot of yet another embodiment of the transfer message that informs the payee of the funds being deposited to a predetermined account.

With reference to FIG. 5C, a screen shot of yet another embodiment of the transfer message 500-3 is shown that informs the payee 130 of the funds being deposited to a predetermined account. When the transfer message 500-3 is sent, the transfer of funds has already started and is not interruptible by the payee 130. In this embodiment, the payee 130 has specified a bank account to receive the funds. All information for the transfer was provided by the payor 110 and/or previously correctly entered by the payee 130 such that no additional information is required. In this embodiment, the transfer takes place without the payee 130 having to claim the funds. The payee 130 could follow the payment enabler link 520 in the payload 516-3 to log into the payment enabler 170 to get status on the transfer and modify the default account for future transfers.

Figure 5D:
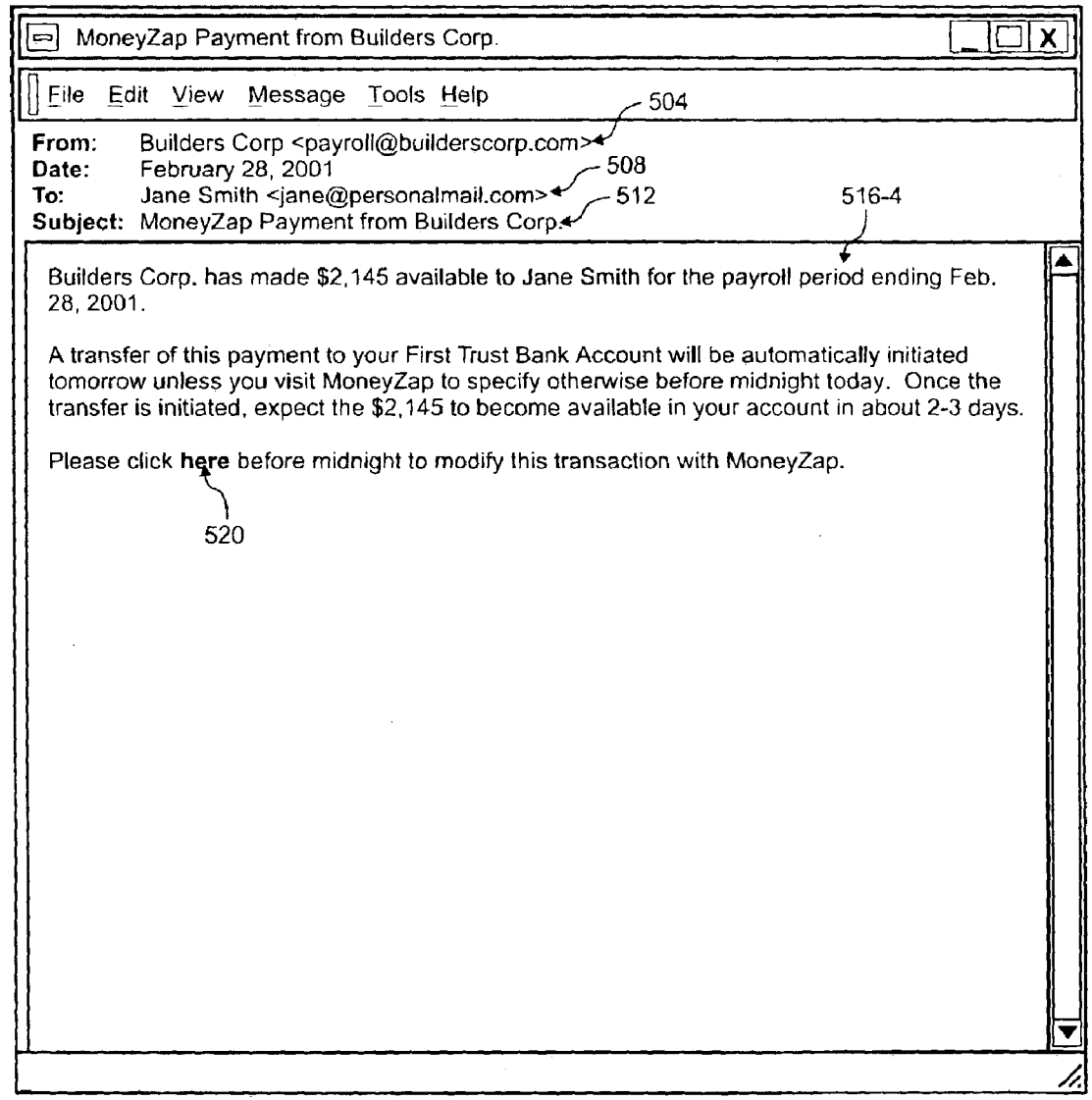
FIG. 5D is a screen shot of still another embodiment of the transfer message that allows the payee a period of time to modify an automated transfer to the predetermined account.

Referring next to FIG. 5D, a screen shot of still another embodiment of the transfer message 500-4 is shown that allows the payee 130 a period of time to modify an automated transfer away from the predetermined account. In this embodiment, the payee 130 is given until midnight to modify the account receiving the funds. While waiting, the funds are held in a stored value fund for the benefit of the payee 130. Other embodiments could use any time period before triggering the automated transfer. If no action is taken by the payee 130, the predetermined account is used for the transfer of funds. The payee 130 can modify the predetermined or default account used for transfers. Also, some embodiments may allow the payee 130 to avoid the holding period such that funds are transferred as soon as possible without the ability to redirect.

Figure 6A:
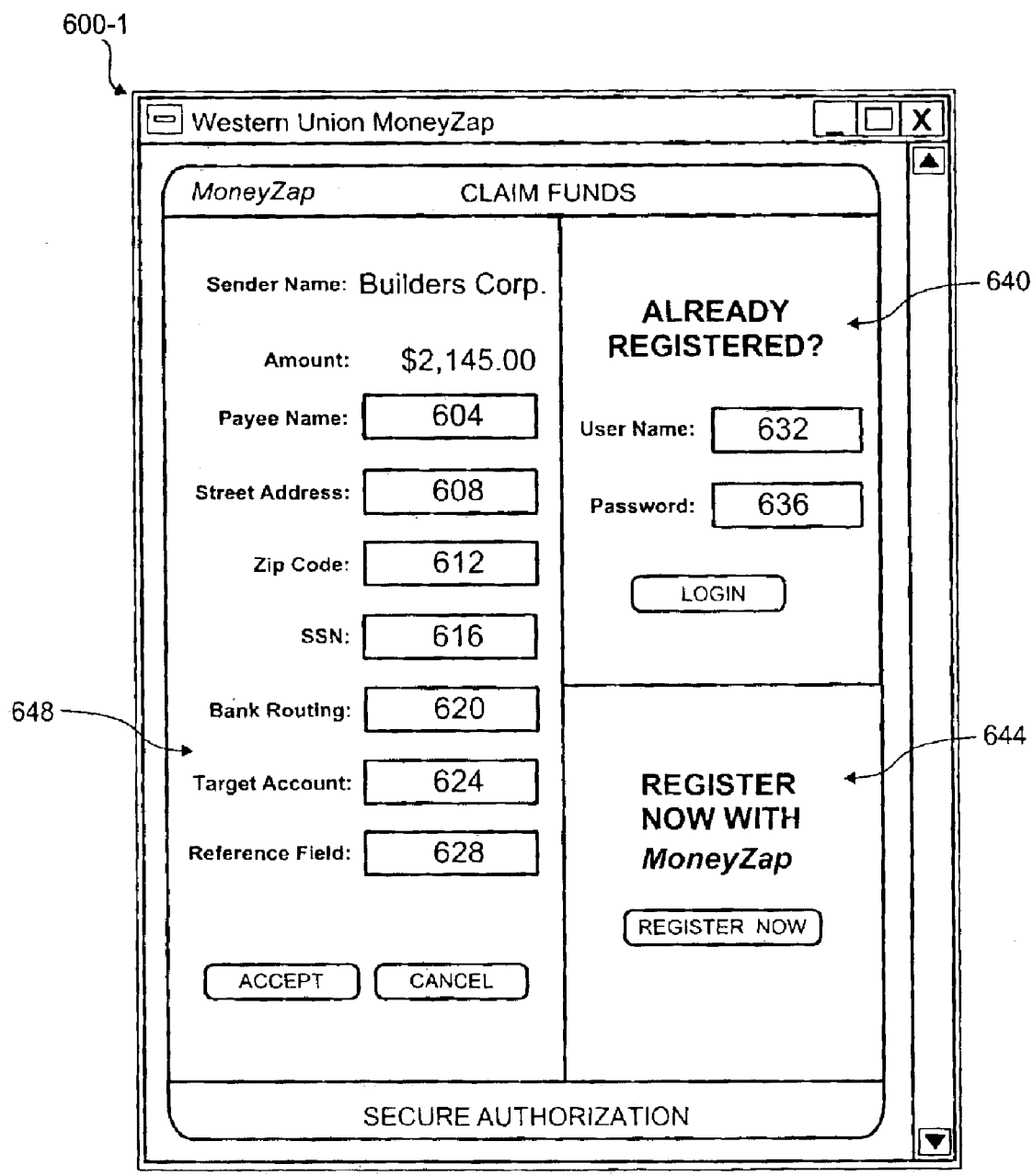
FIG. 6A is a screen shot of an embodiment of a fund claim window.

With reference to FIG. 6A, a screen shot of an embodiment of a fund claim window 600-1 is shown that has optional registration of payees 130. In this embodiment, the payee 130 has activated the payment enabler link 520 in a message payload 516-2 to activate the fund claim window 600-1. The fund claim window 600-1 has a confirmation portion 648, a login portion 640 and a registration portion 644. A new account can be opened using the registration portion 644, but opening an account is optional in some embodiments. For previously registered payees 130, the login portion is used for entry of a user name 632 and a password 636 to authenticate the identity of the payee 130.

The confirmation portion lists transfer information provided by the payor 110. In addition to the payor name and amount, there are modifiable fields for a payee name 604, a payee street address 608, a zip code 612, a social security number 616, a target bank routing number 620, a bank account number 624, and a reference field 628. The payee 130 can modify any of the fields to correct mistakes and otherwise reroute the payment. This embodiment only allows transfer to a bank account, but other embodiments could also allow some or all of the other handlers 160. Some embodiments can prevent modification of some or all fields. In this embodiment, the payee 130 can claim the funds without opening an account by interacting with the confirmation portion 648.

Figure 6B:
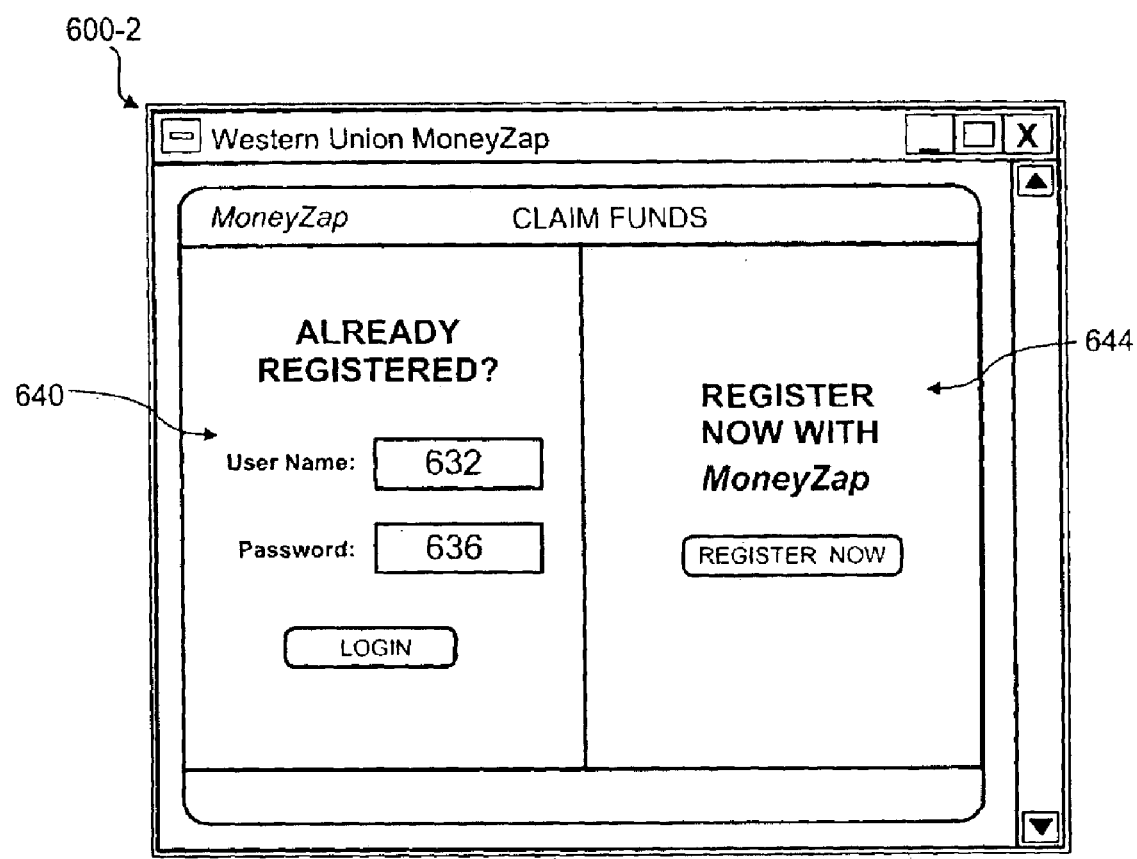
FIG. 6B is a screen shot of another embodiment of the fund claim window.

Referring next to FIG. 6B, a screen shot of another embodiment of the fund claim window 600-2 is shown that requires registration to receive a transfer. This embodiment has a login portion 640 for payees 130 with existing accounts and a registration portion 644 for those payees 130 without accounts. The payee 130 specifies demographic information, transfer preferences and handler information after logging into the payment enabler 170.

Figure 6C:
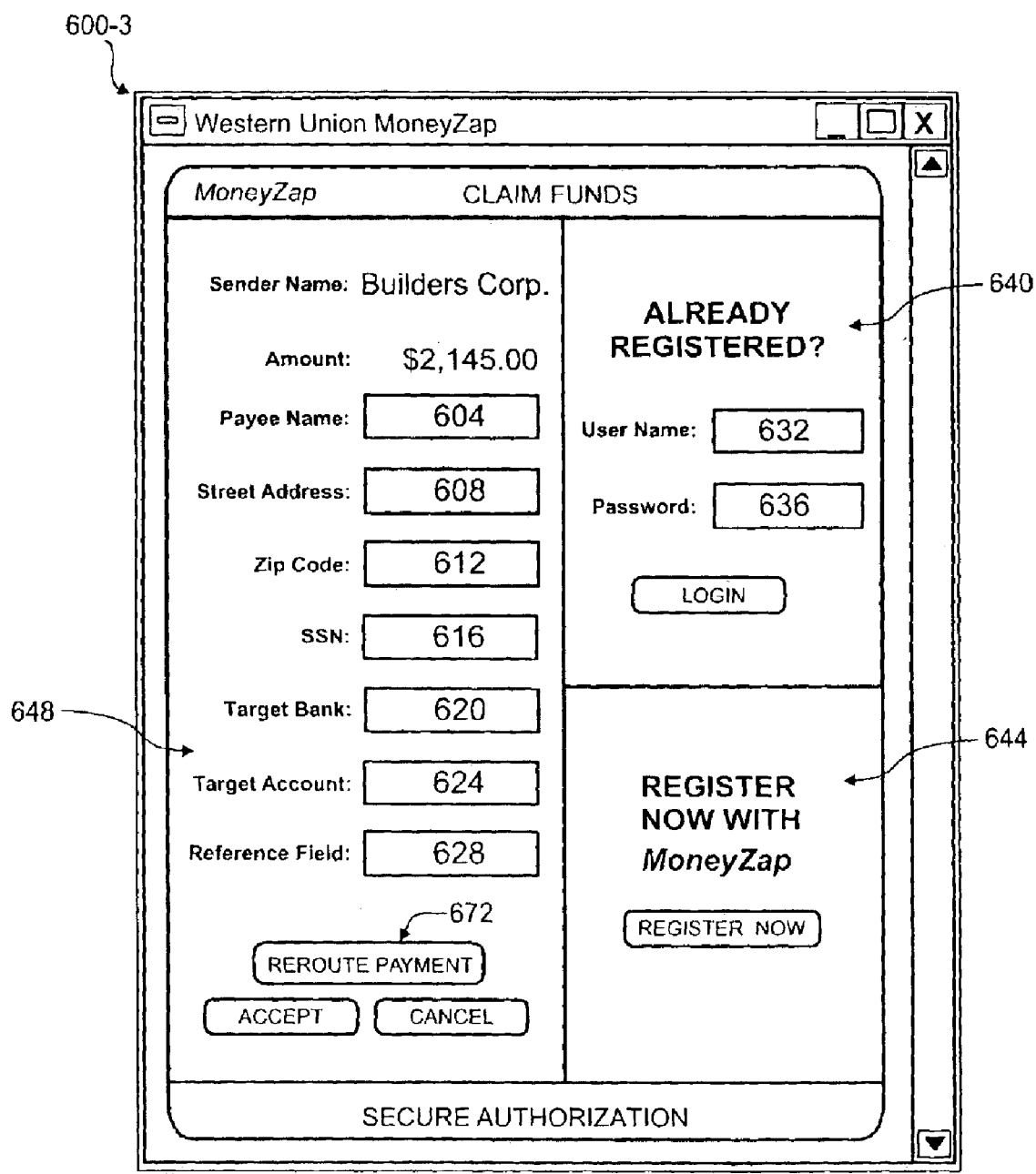
FIG. 6C is a screen shot of yet another embodiment of the fund claim window.

With reference to FIG. 6C, a screen shot of yet another embodiment of the fund claim window 600-3 is shown that allows rerouting a transfer for a period of time. The payee 130 in this embodiment need not open an account, but other embodiments could require an account be created. In the confirmation portion of the claim window 600-3, a reroute button 672 is provided. Activation of that button 672 allows changing the handler 160 for the payee 130.

Figure 7:
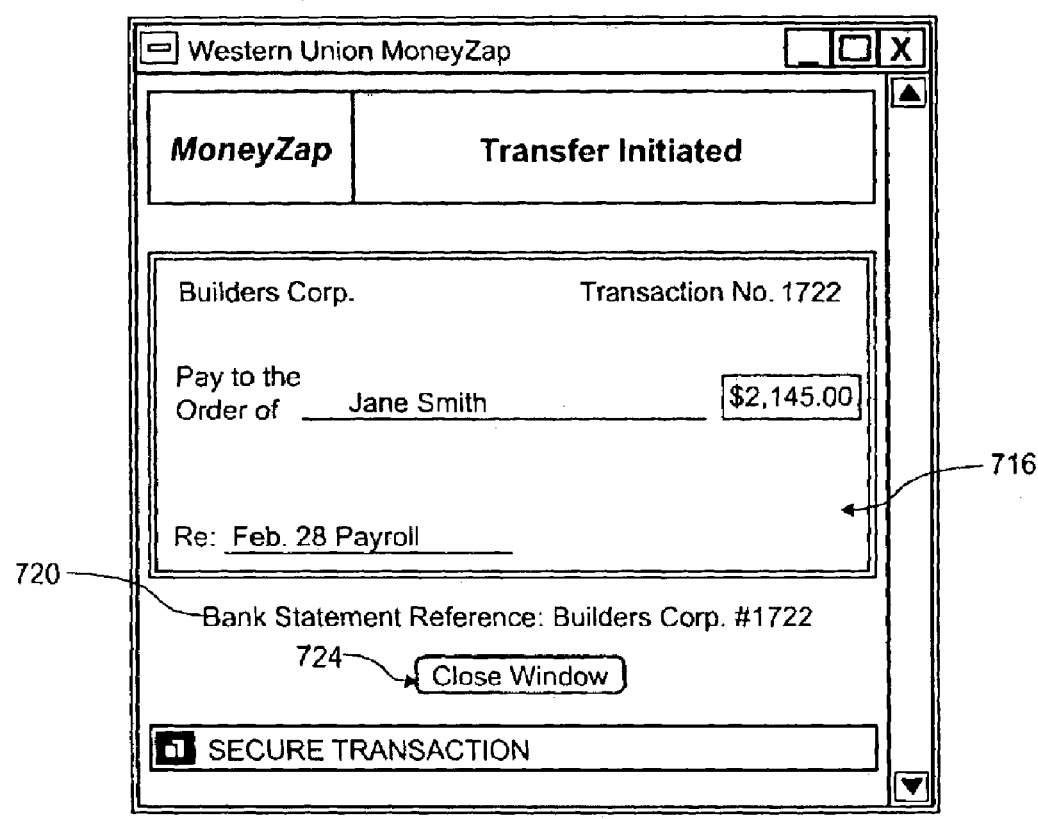
FIG. 7 is a screen shot of an embodiment of a confirmation window.

Referring next to FIG. 7, a screen shot of an embodiment of a confirmation window 700 is shown that uses a paper check metaphor. The confirmation window 708 in this embodiment uses a check metaphor to mimic a paper check similar to that a payor 110 would issue to the payee 130 if the payment enabler 170 were not used. After the user successfully approves the transaction with the fund claim window 600, the confirmation window 700 is presented to the user. A check pictogram 716 is presented in the confirmation window 700 that includes the reference field 628 on the "Re:" line, the merchant name, the amount, the user name, and a transaction number in a manner similar to a traditional paper check. Below the check pictogram 716 is a bank statement reference 720 that is passed in a field in the ACH file used to perform the transfer. Some banks can put this bank statement reference 720 on the statements of the user and/or merchant such that the transaction is readily identifiable from the statement.

Once viewing of the confirmation window 700 is complete, the "close window" button 724 is activated. In this embodiment, activation of that button 724 closes the confirmation window 700 to reveal any underlying windows. In other embodiments, a script customized for the merchant is activated upon clicking the close window button 724. This script could redirect the confirmation window to any site such as a web site of the payor 110. In some embodiments, the script could pull up an advertisement or any other task capable of being scripted upon activation of the button 724.

Figure 8A:
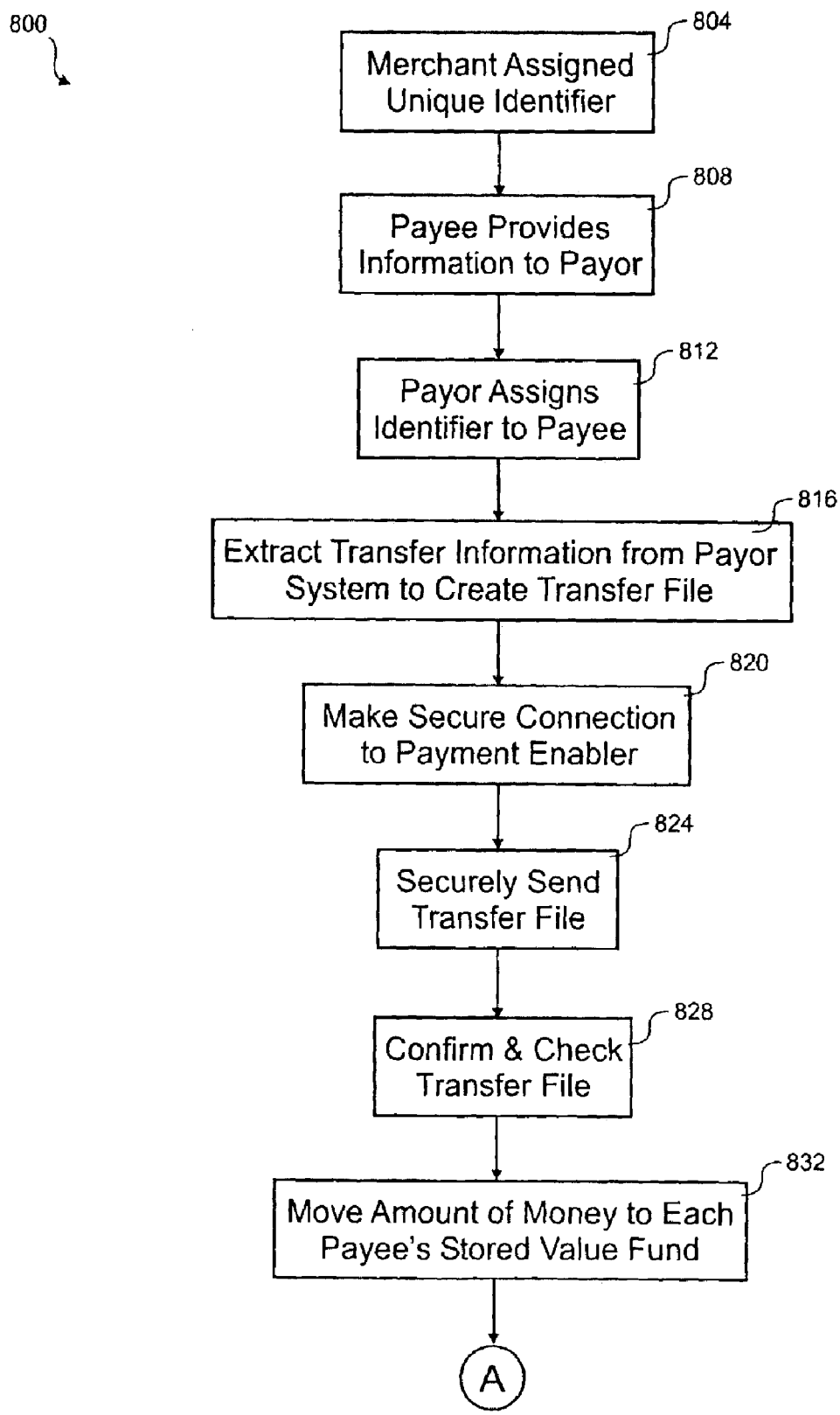
FIGS. 8A and 8B are flow diagrams of an embodiment of a process for configuring and performing a money transfer where all payees are registered before receiving payment.
Figure 8B:
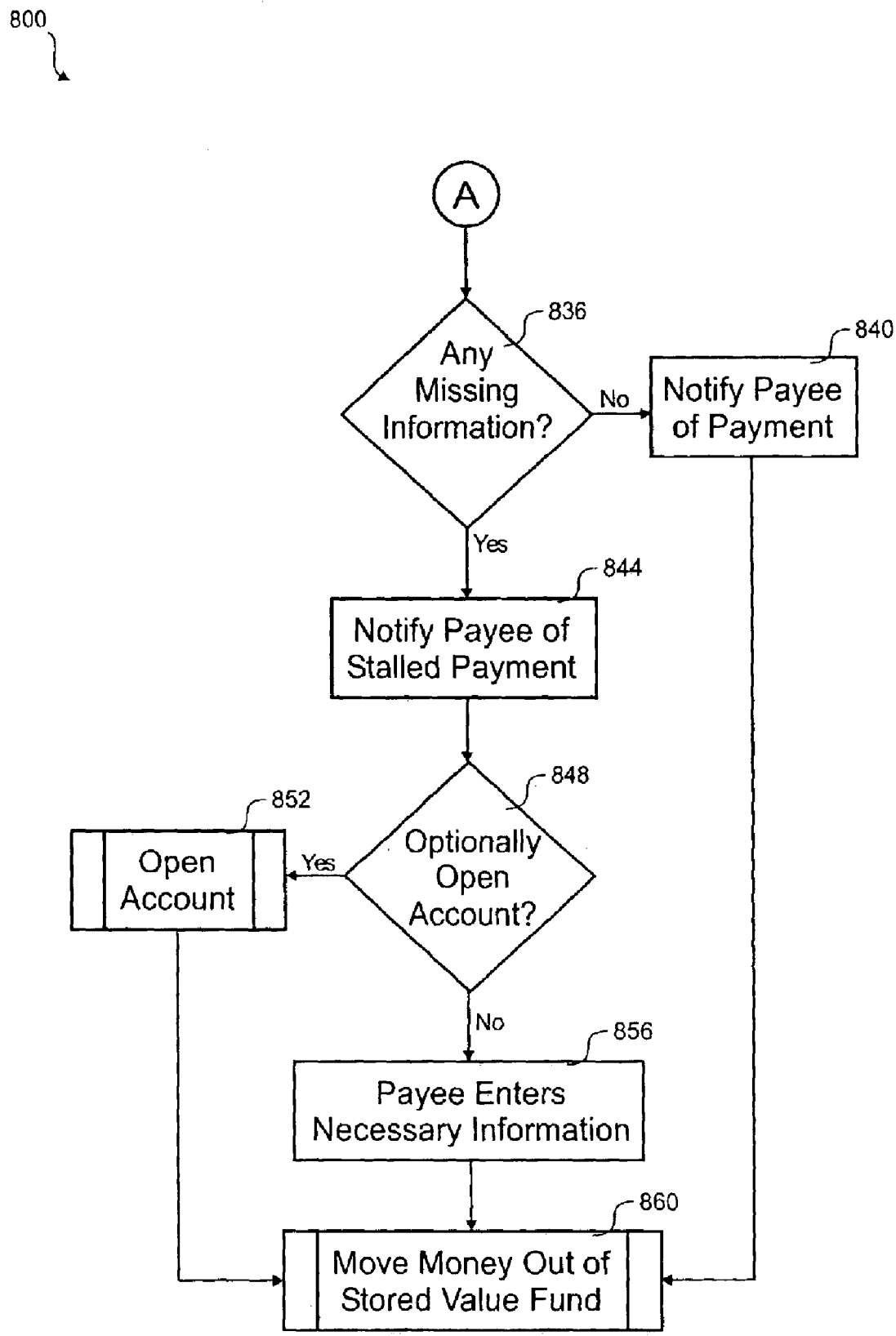

With reference to FIGS. 8A and 8B, a flow diagram of an embodiment of a process 800 for configuring and performing a money transfer are shown. The depicted portion of the process 800 begins in step 804 where a merchant is assigned a unique merchant identifier. Each merchant/payor 110 is given a merchant identifier so payees of the merchant can be distinguished even though each payee identifier may not be unique to the payment enabler 170. For example, a first merchant identifier may have customers numbered sequentially to one hundred and a second merchant identifier may also have customers numbered sequentially to one hundred. A first token for a first payee 130 includes both the first merchant identifier and a first payee identifier to distinguish a second token for a second payee 130 that includes the second merchant identifier and a second payee identifier even though the payee identifiers may be the same.

In step 808, the payee 130 provides information to the payor 110 to configure the transfer. The payee 130 can choose the handler 160 to target the funds to and would provide any details for accessing his or her account through the handler 160. For example, where the payee 130 wants funds passed to a bank account, a payee name, an e-mail address, a payee mail address, a government issued identification number, a bank routing number, and a bank account number is provided in one embodiment. A form could be completed by the payee 130 that is entered by the payor 110. Only the e-mail address is needed by the payor 110 to begin the transfer process with other information left for later gathering.

The payor 110 assigns an identifier to the payee 130 in step 812. This identifier could be a number used for another purpose of the payor's, for example, an employee identification number, a customer number, a transaction number, etc. The information gathered is stored in the payor system. Periodically in step 816, a transfer file is formulated by the payor 110 that includes various transfers to perform for the benefit of various payees 130. The transfer file can have any number of transfers. The transfer file retrieves information on the payee 130 and the transfer for inclusion in the transfer file. For new payees 130, all the information is gathered for the payees 130 and included in the transfer file. Later transfer files could include the information again or only include the information that has changed. A format like XML could be used for the transfer file. Each transfer includes a token to identify the payee 130, a transfer amount and any demographic, handler and authentication information not previously sent. Although this embodiment uses a file interface 180-6 to pass transfer information, any handler interface 180 could be used in other embodiments to send one or more transfers at a time.

In step 820, a secured connection is made from the payor 110 to the payment enabler 170. To protect the transfer file during transfer in step 824, this connection could be secured by a private circuit-switched connection or a packet-switched connection with encryption. In step 828, the transfer file is checked to verify integrity. A checksum and/or a hash function could be used to verify integrity. A first transfer is made in step 832 from the account of the payor 110 to the stored value fund of each payee 130. The payor 110 previously configured the payment enabler 170 to draw transfers from a particular money handler 160. Processing continues from step 832 to step 836 of FIG. 8B.

It is determined in step 836 if there is any information missing to complete the transfer to the payee 130. The information could have been provided from the payor 110 or the payee 130 could have entered the information into the payment enabler 170 previously. This embodiment does not care if the payee 130 is registered or not. Where no information is missing, the payee 130 is optionally sent a transfer message 500-3 in step 840 with status information on the transfer. The payee 130 can optionally configure the payment enabler 170 to send status information in this and various other circumstances. In step 860, the funds are moved out of the stored value fund of the payee 130 into the previously specified account using the appropriate handler 160. Where the payee 130 has no account with the payment enabler 170, the stored value fund could be a temporary one.

Returning to step 836, it could be that there is information missing to perform the transfer. The payee 130 is notified of the stalled payment by the messaging function 316 sending a transfer message 500-1 in step 844. From step 848, the payee 130 can optionally open an account in step 852 by interacting with a registration portion 644 of the fund claim window 600-1. Alternatively from step 848, the payee 130 can enter any missing information by interacting with a confirmation portion 648 of the fund claim window 600-1 in step 856. In step 860, the funds are moved out of the stored value fund of the payee 130.

This embodiment performs two transfers to pass funds from the payor 110 to the payee 130. The first transfer in step 832 passes funds from the money handler 160 of the payor 110 to the payment enabler 170. After any holding period, a second transfer in step 860 moves the funds out of the payment enabler 170. An account at the payment enabler 170 has the funds in the holding period, which is reflected in a stored value fund of the payee 130. Other embodiments could perform steps 832 and 860 after the holding period. That is to say, once the necessary information is entered and the transaction is no longer stalled, the two transfers would occur.

Although the payor 110 in the above embodiment formulates the token, the payment enabler could formulate the token in other embodiments. The payee 130 could interact with the payment enabler 170 in order to generate a token. A web page, an e-mail, a phone call, etc. could relay the token to the payee 130. The token could merely identify the payment enabler account of the payee 130 such that funds sent using that token would go to that account. The payee 130 could configure the payment enabler 170 to automatically send those funds to a target money handler account upon receipt from the payor 110. The token could identify the payee 130 and a target account with a code which the payor 110 could not use to determine the identity or target account of the payee 130. Upon receipt of a transfer file with that token and an amount, the payment enabler 170 would retrieve the corresponding handler information and transfer the amount to the targe account with the specified handler.

In some embodiments, the token issued by the payment enabler 170 could include handler information in plain text or encrypted formats. For example, the payee 130 could visit the payment enabler 170 with bank account information. The payment enabler 170 could generate a token that encrypts the bank account information using a private key, for example. The account information is not available to the payor 110 because of the encryption. In some embodiments, some of the information in the token could be in plain text while other portions are in cipher text. The payor 110 would send the token with a transfer amount to the payment enabler 170 who would transfer funds corresponding to that amount to the bank account previously specified by the payee 130.

In other embodiments, the payor 110 could create the token with account information embedded therein. The payor 110 would gather the account information from the payee 130 and create a token embedding that information according to a standard used by the payor 110 and payment enabler 170. A public or private key scheme could be used to protect the information in the token. Upon receipt of the token, the payment enabler 170 would send the specified amount to the specified account of the payor 130. Where the token includes all the transfer information, the payee 130 need not interact with the payment enabler 170 to complete the transfer or otherwise supply missing information.

Figure 9A:
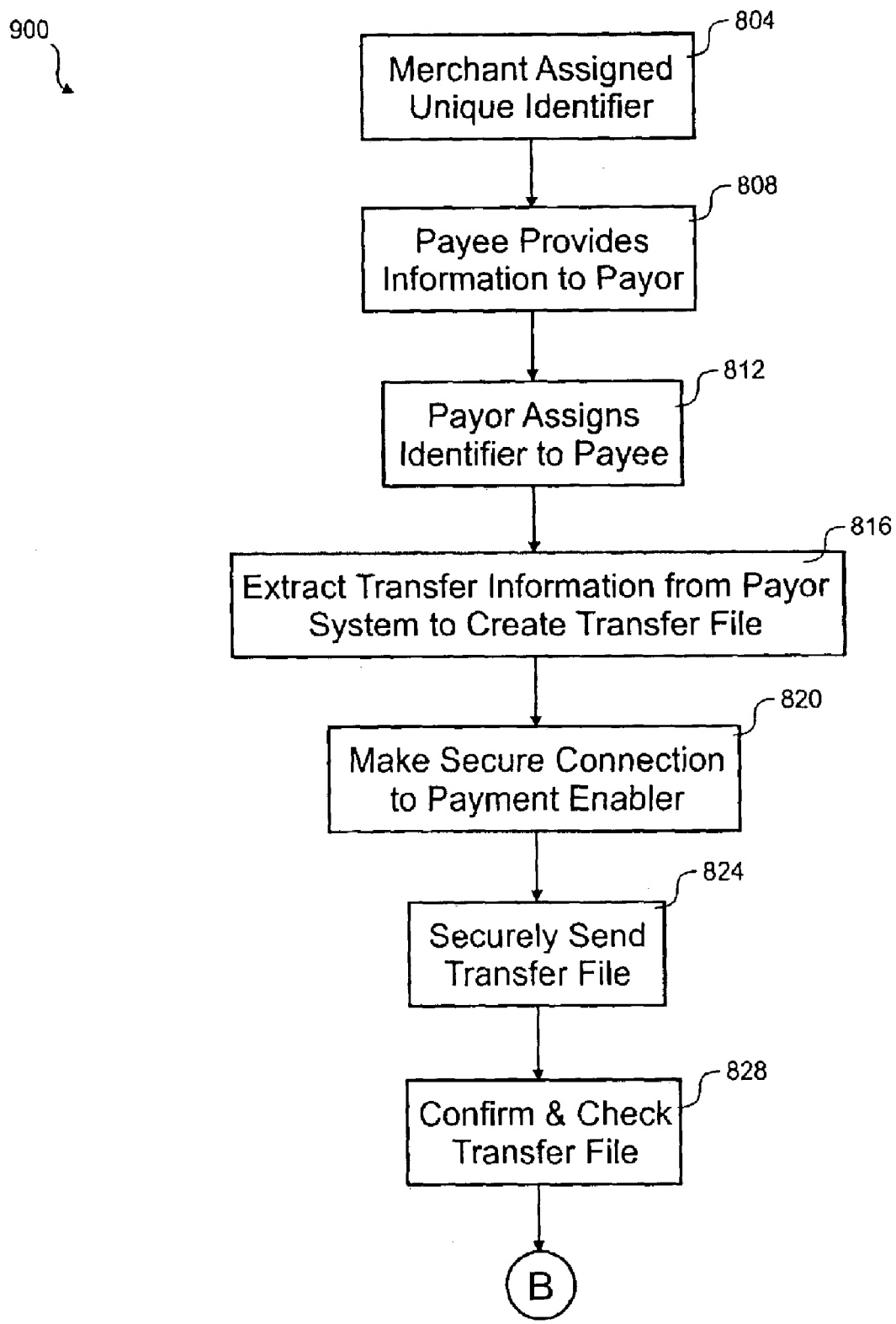
FIGS. 9A and 9B is a flow diagram of another embodiment of a process for configuring and performing a money transfer where none of the payees have to register with the payment enabler.
Figure 9B:
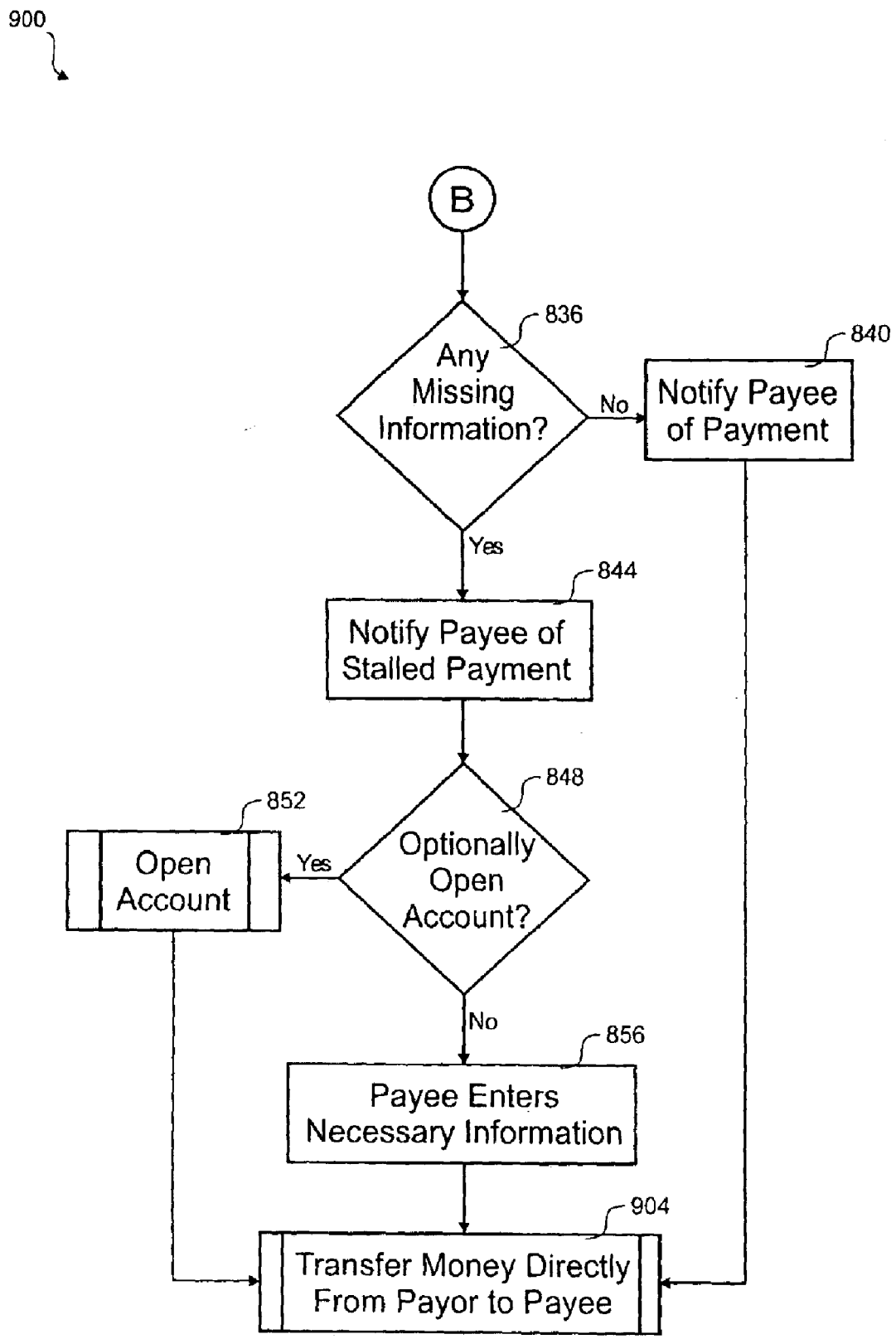

Referring next to FIGS. 9A and 9B, a flow diagram of another embodiment of a process 900 for configuring and performing a money transfer are shown where none of the payees 130 have to register with the payment enabler 170 to receive funds. Differentiating this embodiment from that of FIGS. 8A and 8B, this embodiment transfers money directly from the account of the payor 110 to the account of the payee 130 with a single electronic transfer in step 904. This embodiment performs a bank transfer using a ACH network. To perform transfers using different handlers 160 for the payor 110 and payee 130, the stored value fund is used in the middle of that transfer. Where the handler 160 is the same for both payor 110 and payee 130, a single transfer could be performed if that handler supports it. For example, a transfer of airline miles with the promotion handler 160-1 could be performed for miles in the same frequent flyer program. Transferring between different frequent flyer programs could involve a stored value fund to allow converting the denomination of those miles.

Figure 10A:
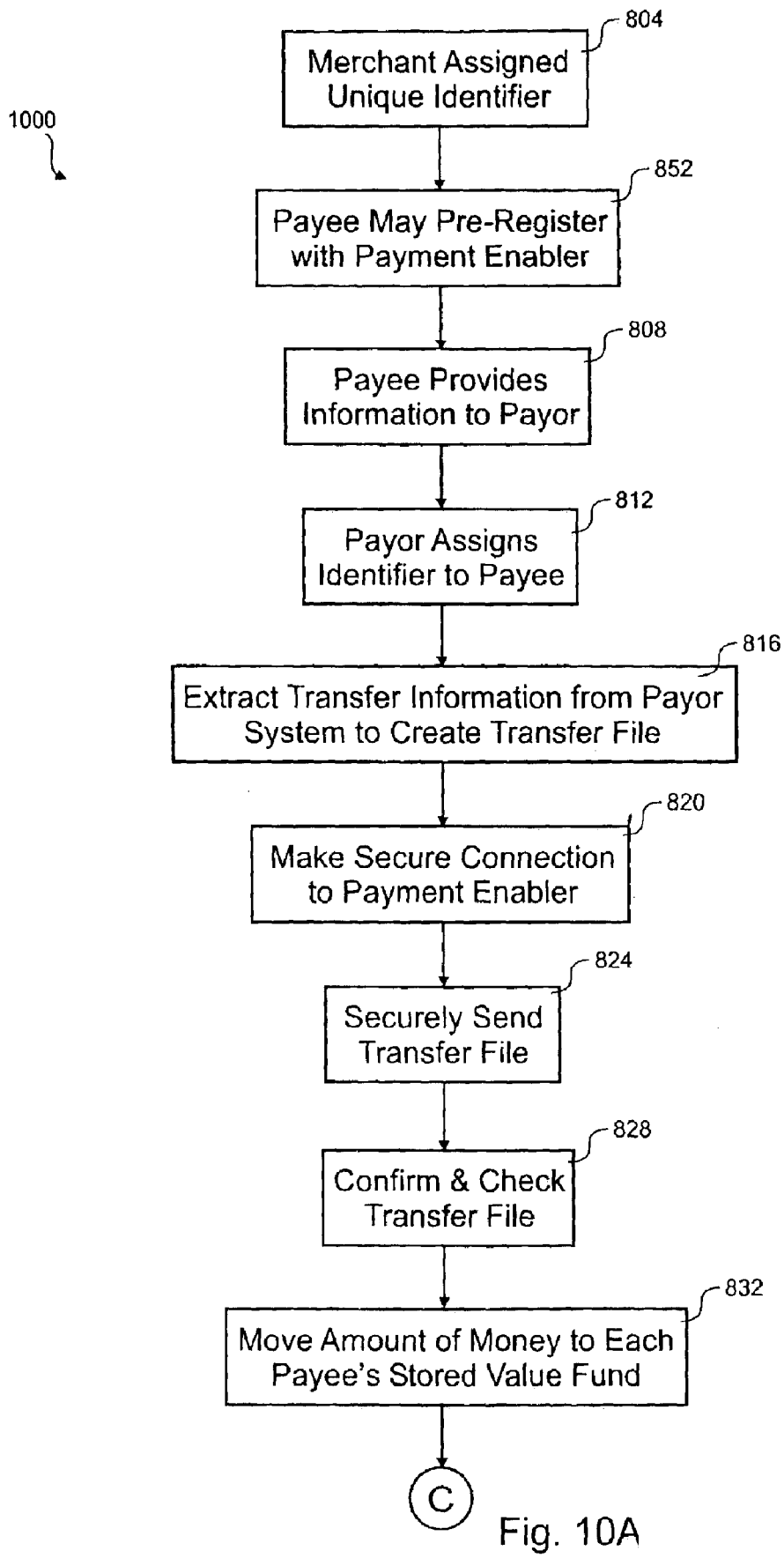
FIGS. 10A and 10B is a flow diagram of yet another embodiment of a process for configuring and performing a money transfer where all payees are registered with the payment enabler.
Figure 10B:
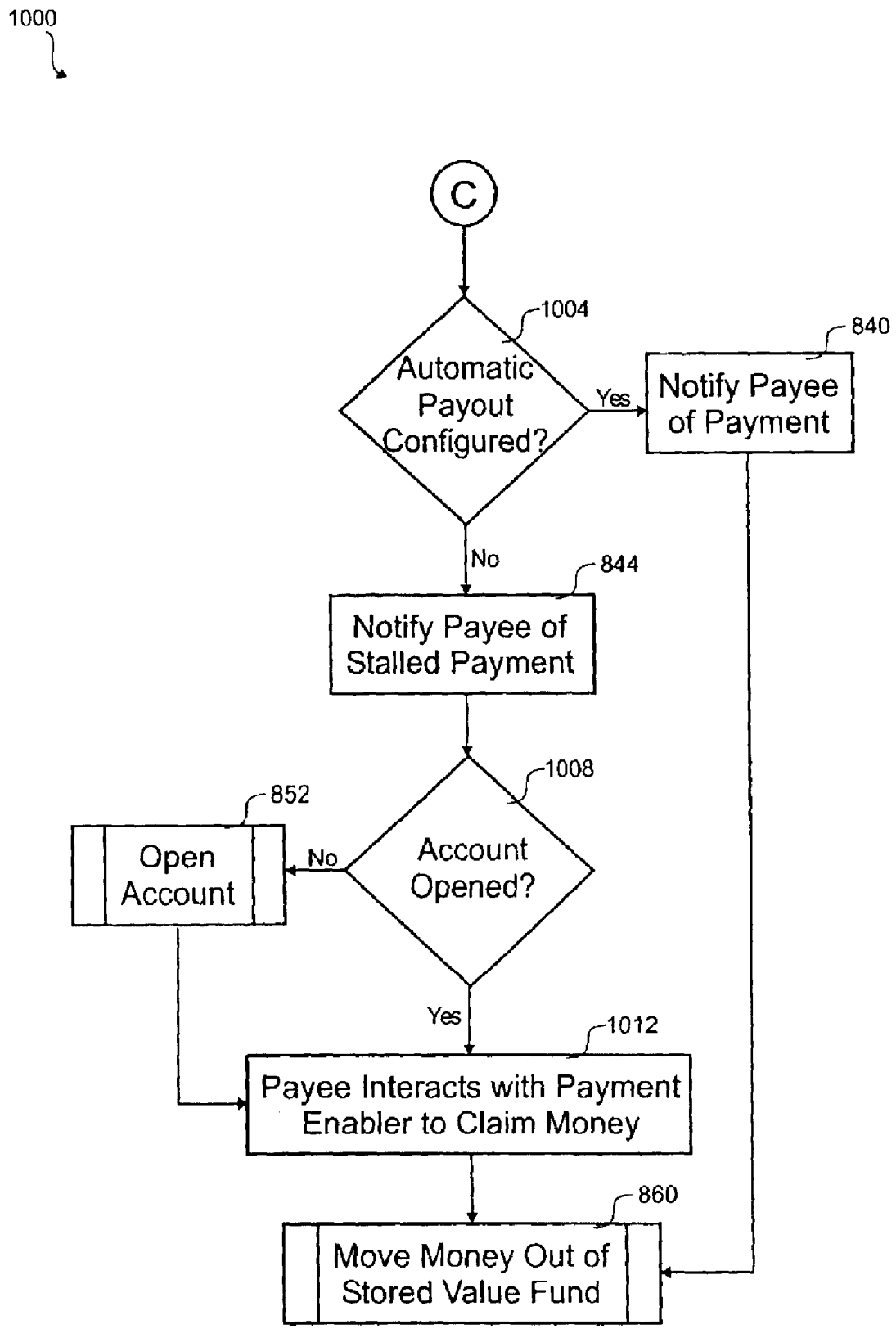

With reference to FIGS. 10A and 10B, a flow diagram of yet another embodiment of a process 1000 for configuring and performing a money transfer are shown where all payees 130 are registered with the payment enabler 170 before the transfer is completed. The first portion of the process 1000 in FIG. 10A is largely the same as the process 800 in FIG. 8A.

Differences appear in step 1004 of FIG. 10B where it is determined if an automatic payout is configured. Where the payee 130 has an existing account, he or she can configure the payment enabler 170 to automatically transfer payments out of their stored value fund. The transfers can be for all funds in the stored value or funds from a particular payor 110. A transfer can happen as funds are received or according to some periodicity. Funds can be held in the account until a threshold amount is crossed that would trigger an automated payout. Where an automated payout is configured, a transfer message 500-3 is sent to the payee 130 with status in step 840 before the transfer from the stored value fund is performed in step 860.

Where there is no automated payout configured, processing continues from step 1008 to step 844 where the payee 130 is sent a transfer message 500-2 with notification of the stalled payment. Step 1008 differentiates the payees 130 on whether they have configured accounts already. A link the transfer message 500-2 brings up a fund claim window 600-2 that allows creating an account through the registration portion 644 in step 852 or logging into an existing account through the login portion 640 in step 1012. Once logged into a new or existing account, the payout is performed in step 860.

Figure 11A:
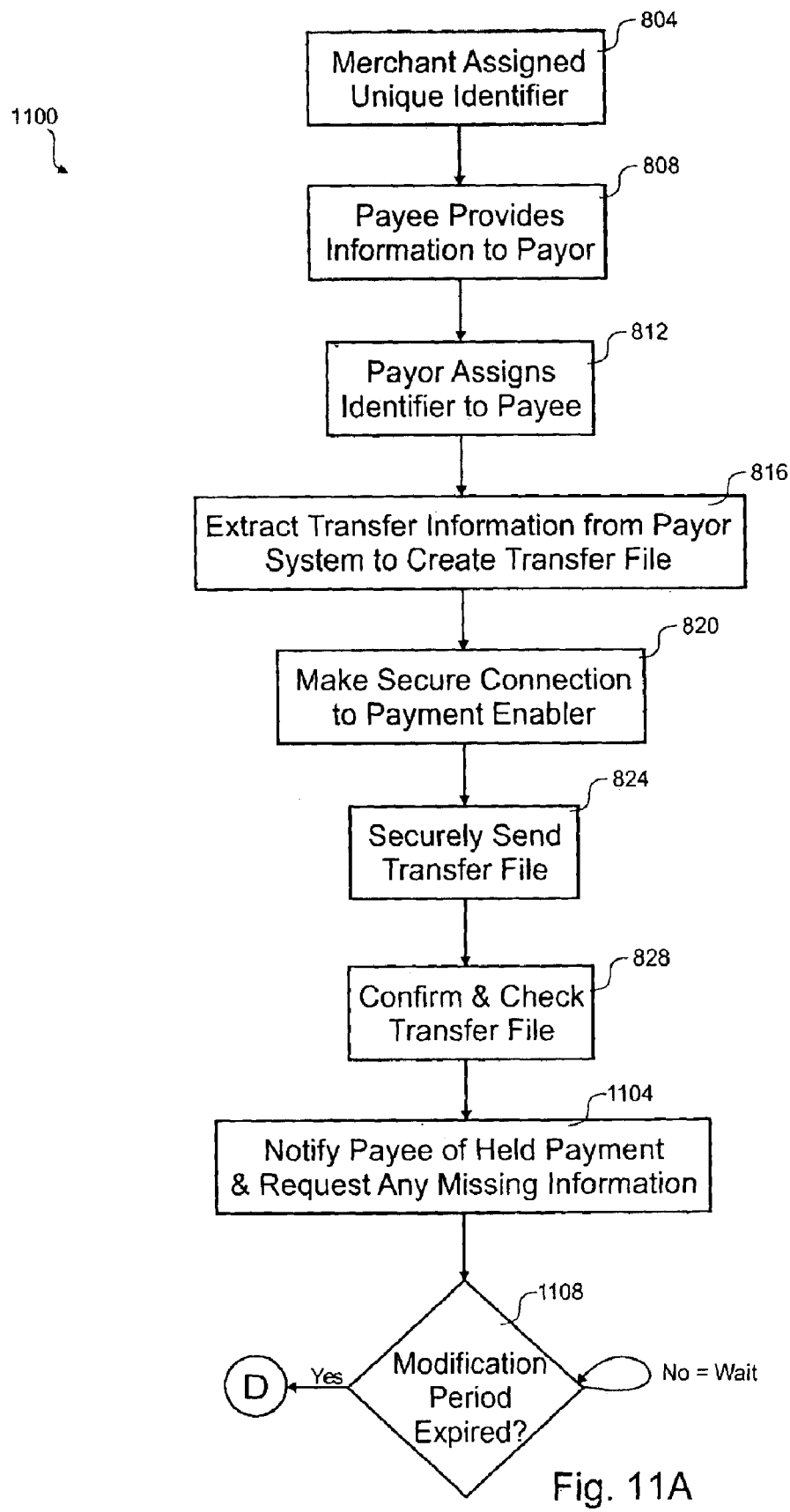
FIGS. 11A and 11B is a flow diagram of still another embodiment of a process for configuring and performing a money transfer where a target account is used unless the payee redirects payment.
Figure 11B:
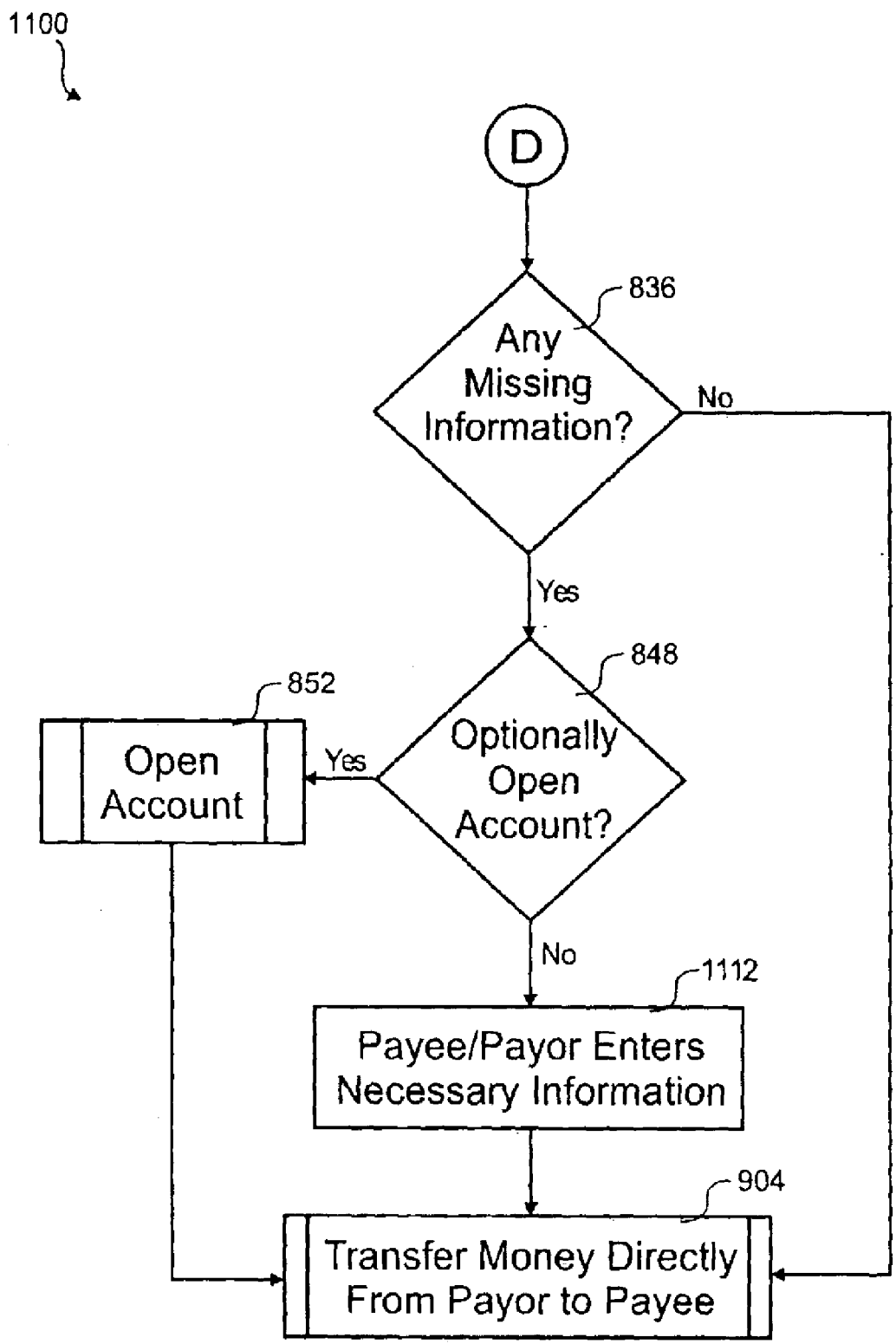

Referring next to FIGS. 11A and 11B, a flow diagram of still another embodiment of a process 1100 for configuring and performing a money transfer are shown where a target account is used unless the payee 130 redirects payment elsewhere. This embodiment has a holding period where the payee 130 can redirect or refuse the transfer. The process 1100 is largely the same as the process 800 of FIG. 8A until step 1104 where a transfer message 500-4 is sent. The payment is held for a period of time or until deadline in step 1108. At any time before expiration of the holding period, the payee 130 can follow the payment enabler link 520 to a fund claim window 600-1. If any information is missing, the payment is held despite any holding period in step 836 of FIG. 11B. Where no information is missing and the holding period is expired, the transfer is made directly from the payor 110 to payee 130 in step 904.

If additional information is required, processing goes from step 836 to step 848 where the payee 130 can open an account in step 852. In this embodiment, the payee 130 having an account is optional, but in other embodiments an account is required. If no account is desired, processing continues to step 1112 where either the payee 130 or payor 110 can enter missing information into a confirmation portion 648 of a fund claim window 600, for example. In this embodiment, the payor 110 can enter information missing from the transaction after being notified of such a deficiency. In some cases, the payor 110 may have entered the information incorrectly or it might be more convenient for the payor 110 to enter this information. After the information to perform the transfer is received, the transfer is made directly between the accounts of the payor and payee in step 904.

Figure 12A:
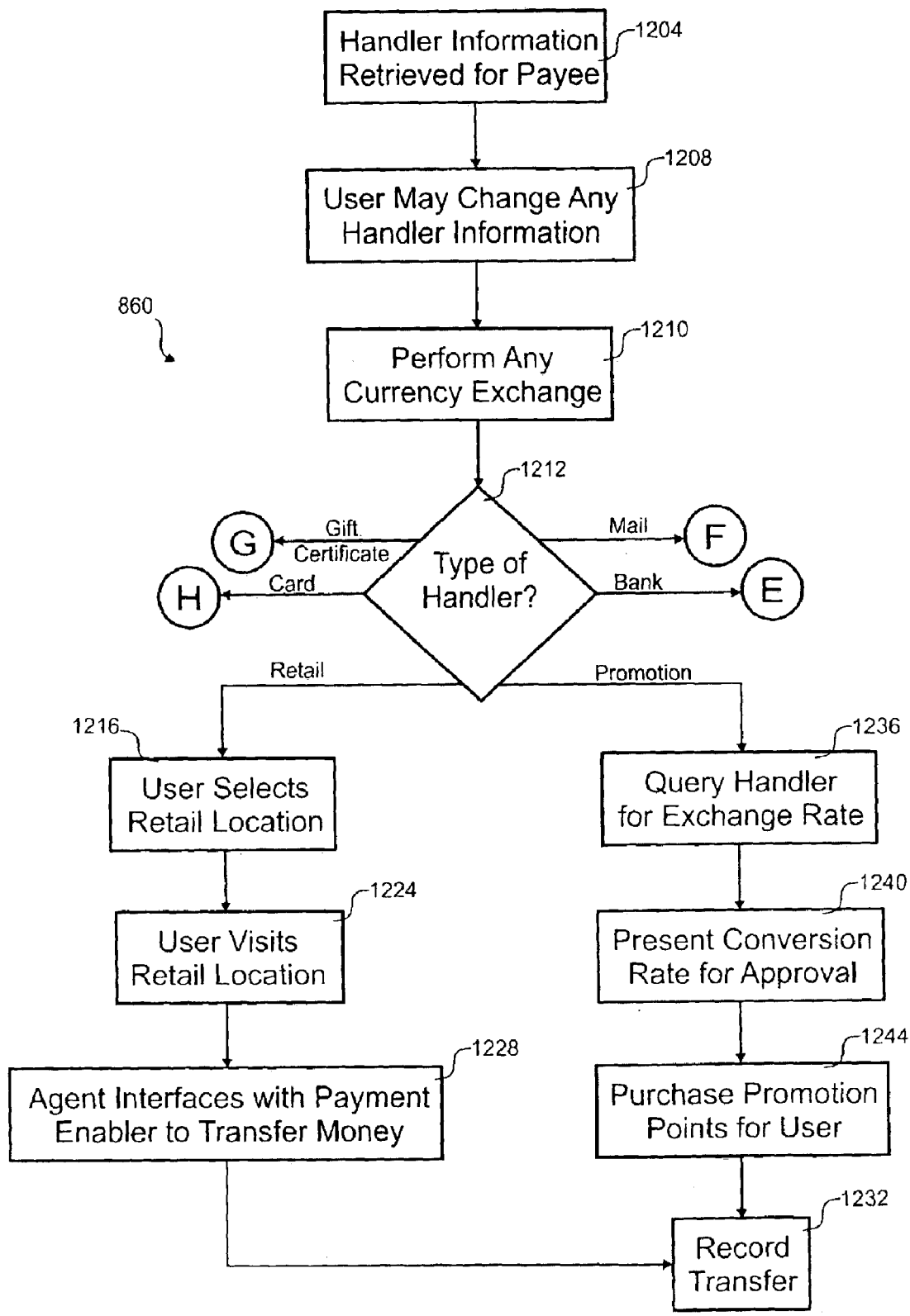
FIGS. 12A and 12B is a flow diagram of an embodiment of a process for paying-out funds from the payment enabler.
Figure 12B:
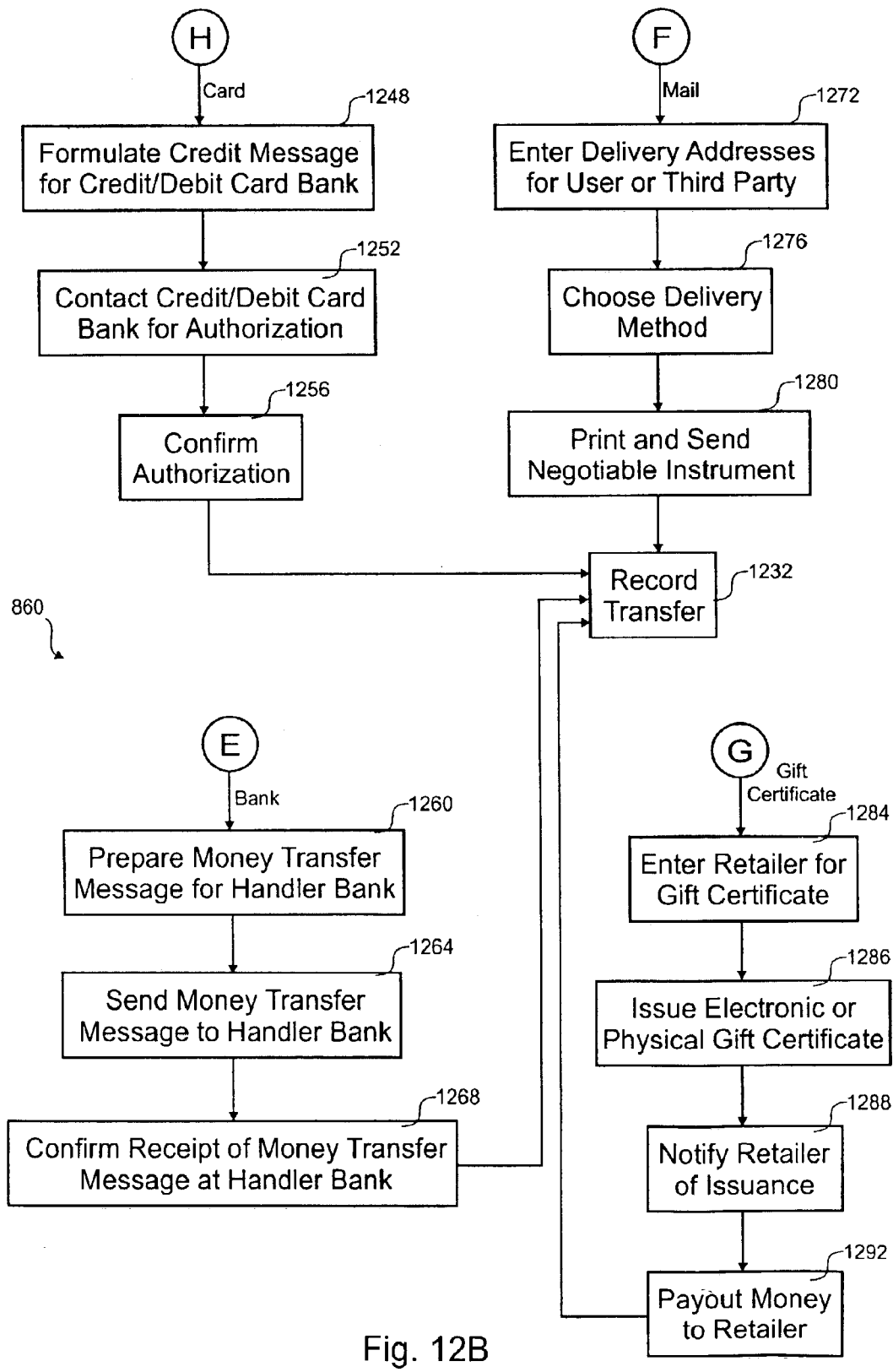

Referring to FIGS. 12A and 12B, a flow diagram of an embodiment of a process 860 for moving money out of a stored value fund for a payee 130 are shown. In some embodiments, the payor 110 pays funds into the stored value account of the payee 130 where the payee 130 can direct where the funds should be paid-out. This embodiment allows paying-out money in at least six different ways, namely, by: pick-up at a retail location 125, exchanging for promotional credit, a credit to a debit/credit card, a credit to a bank account, mailing a negotiable instrument, and sending an electronic or a printed gift certificate. The depicted portion of the process 860 begins in step 1204 where the default pay-out handler information is retrieved for the payee 130. In step 1208, a web page is presented that allows the payee 130 to select a different handler 160 or to change information for the current handler 160.

A user 130 may have a number of different currencies of money or promotional credits in their stored value fund. The user 130 may select some or all of the different currencies for paying out. In many cases, a particular handler 160 only accepts money in a single currency or the user 130 may simply wish to exchange money to another currency. In step 1210, any currency is exchanged. The exchange rate database 332 is queried for the current rate that is applied by the payment conversion function 328.

In step 1212, processing branches in one of six directions depending on the type of handler 160 the user 130 has chosen. The first two directions are depicted on FIG. 12A and the remainder are depicted on FIG. 12B. One branch beginning in step 1216 corresponds to the user 130 visiting a retail location 125 to transfer out money with the assistance of the agent. In step 1216, the user selects a retail location 125 that is convenient. The user visits the retail location 125 in step 1224 to either use a kiosk interface 180-2 or use the agent. In this embodiment, the user interfaces with the agent who uses the retail interface 180-4 to the payment enabler 170. From the retail interface 180-4, the agent can transfer the money to any handler 160, can print a negotiable instrument or can provide cash to the user 130. The transfer is recorded by the payment enabler 170 in step 1232.

In another branch that begins in step 1236, a promotion program is chosen as the handler 160-1. Either the promotion handler 160-1 or the exchange rate database 332 can be queried in step 1236 to determine the exchange rate for program credits or points. In step 1240, the conversion rate is presented to the user for approval. Presuming the rate is approved, the promotion credits or points are purchased in step 1244 by interfacing with the promotion handler 160-1. The payout of money to the promotion handler 160-1 is recorded in step 1232.

In yet another branch that begins in step 1248 of FIG. 12B and is Tabled "H," a credit card or debit card is used to transfer out money from the system 100. In step 1248, a credit message is formulated for the card issuing bank. In some embodiments, the identity of the card holder may be further authenticated by entry of a PIN or other verification method. The card bank is contacted in step 1252 for authorization of the credit. Authorization of the credit is performed in step 1256. The payout is recorded with the payment enabler 170 in step 1232.

In the branch labeled "E," a bank transfer is used to payout money from the system 100. In step 1260, an EFT message is formulated for the bank handler 160-4 to transfer funds from the stored value fund to the bank account of the payee 130. The EFT message is sent to the bank handler 160-4 in step 1264 by way of the ACH network, for example. Receipt of the EFT message is confirmed by the handler interface 308 in step 1268 and the transfer is recorded in step 1232.

In the branch of FIG. 12B labeled "F," a negotiable instrument is printed and sent to the payee 130 or some other party. In step 1272, the user enters the delivery address and a name to pay the negotiable instrument to. The user 130 can send the negotiable instrument to herself or a third party. A delivery method for sending the negotiable instrument is chosen in step 1276. In step 1280, the negotiable instrument is printed or otherwise produced and sent. The payout is recorded in the user database in step 1232.

In the last branch of FIG. 12B labeled "G," a gift certificate is used to payout the credit in the payee's stored value fund. In step 1284, a retailer(s) is chosen as a target for the gift certificate. In step 1286, the electronic or physical gift certificate is printed and mailed to any address provided by the payee 130. If the gift certificate is limited to a single person by the retailer, the payee 130 would enter the name of that person also. The retailer is notified in step 1288. In step 1292, the money is paid-out to the retailer in the case such that a store credit exists for the benefit of the payee 130 or some other party chosen by the payee. The merchant will honor the gift certificate when used to purchase items.

Figure 13:
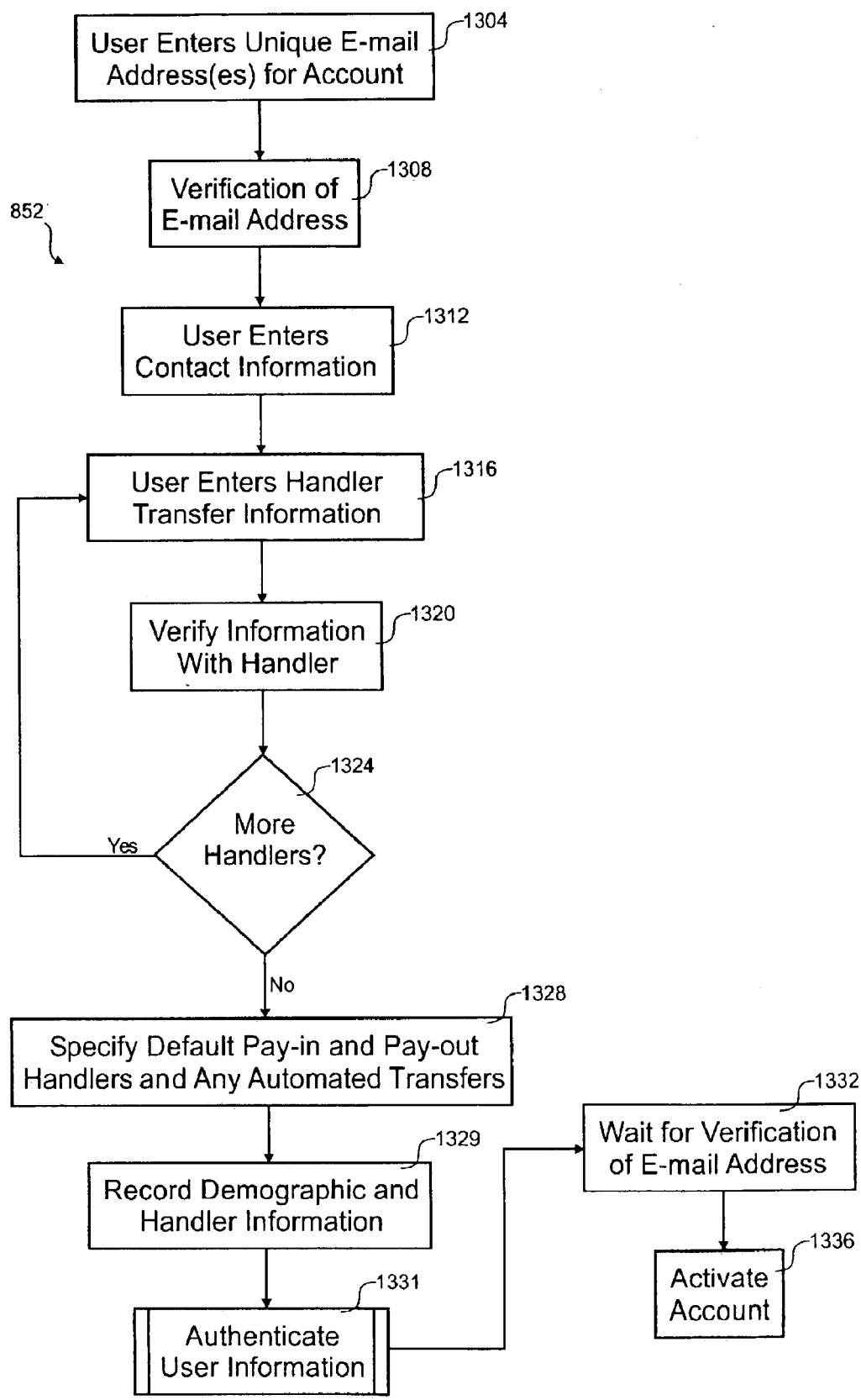
FIG. 13 is a flow diagram of an embodiment of a process opening an account with the payment enabler.

With reference to FIG. 13, a flow diagram of an embodiment of a process 852 opening an account with the payment enabler 170 is shown. This embodiment creates an account for every user. That account could be created to complete the transfer or could be created in advance to the online transaction. The account could be used to purchase items at any number of merchants who accept payment from the payment enabler 130 or to transfer funds to anyone else for any purpose. The depicted portion of the process 852 begins in step 1304 where the user enters an e-mail address as the unique identifier for the account. The user may want to enter any other e-mail addresses that are aliases of the user and that may be used by counter parties to a transaction. Other embodiments could use any unique identifier for the user instead of an e-mail address, for example, a user name could be used.

Once an e-mail address is given to the payment enabler 170, it is verified. A message is sent to the e-mail address in step 1308. A code embedded an URL is provided in the verification e-mail such that the user can click on the URL to load a page where the code is entered to verify the e-mail address. In this embodiment, the code is a randomly generated set of alphanumeric characters. Other embodiments could use any number of methods to verify the e-mail address.

The user enters contact information into a web page of the Internet interface 180-3 in step 1312. This contact information could include address, phone number, wireless pager number or address, instant message address, wireless phone address, contact e-mail address, etc. In some cases, the user 130 could be creating an account with the payor 110 and that payor 110 could pass any contact information to the payment enabler 170 to allow prepopulating some fields in the forms. For example, the transfer file could include some account information on the payee 130 that is used by the payment enabler 170 to ease entry of information during the account creation process. In step 1316, the user enters handler interface information. For example, the user might enter credit card information and/or bank account information. In step 1320, the information is verified with the handler 160 to the extent possible for that handler 160. In step 1324, the process 852 can loop back to step 1316-for entering and verifying additional handlers.

In step 1328, a default input handler 160 and a default output handler 160 can be chosen for transferring money into and out of the system 100 for that user 110, 130. These two handlers 160 may be different. In some cases, a user may act as a payor 110 or payee 130 and vice-versa such that any account with the payment enabler 170 could both send and receive funds. With this in mind, only one handler may be defined for a payor 110 or payee 130 so long as he or she doesn't anticipate changing roles for any transfers. Also, any automated transfers can be defined by the payee 130 in step 1328. The information entered by the user is stored in the user database 160 in step 1329. In some embodiments, the user could be authenticated in step 1331. In step 1332, the payment enabler 170 waits for verification at least one of the e-mail addresses before activating the account for sending and receiving money with that account in step 1336. Various embodiments may or may not complete a pending transfer while waiting for verification of the e-mail address.

Figure 14:
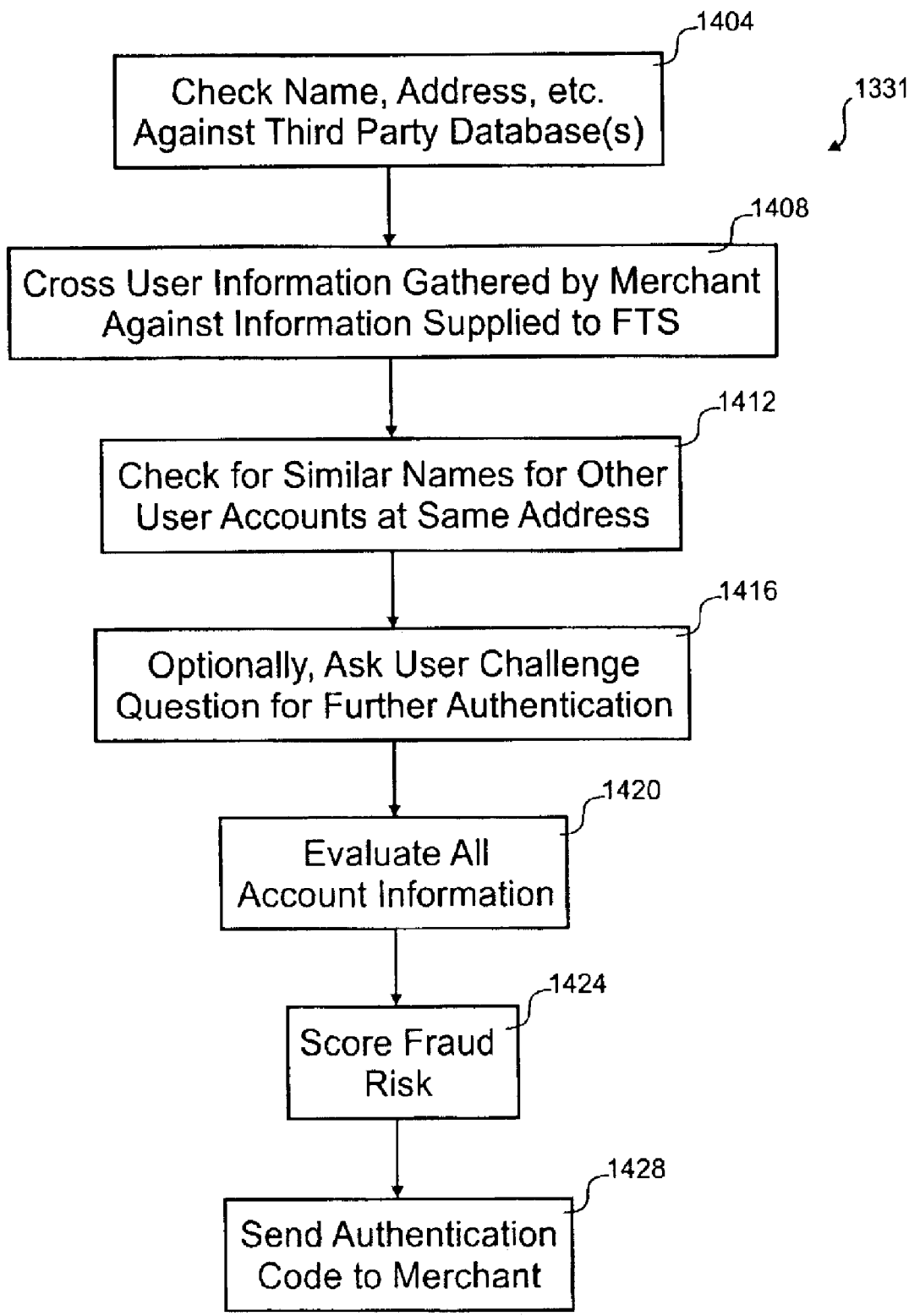
FIG. 14 is a flow diagram of an embodiment of a process for authenticating a user.

With reference to FIG. 14, a flow diagram of an embodiment of a process 1331 for authenticating user information is shown. Information from users and merchants can potentially be fraudulent or have mistakes. The reliability of the information and the credit worthiness of the payment enabler accountholder influences the fraud risk score of a user. During the account creation process 852, a name, an address, account numbers and other information is provided to the payment enabler 170. In step 1404, this supplied information is checked against databases of information that may be maintained by third parties. Information that the payor 110 previously gathered for the user is provided to the payment enabler 170. In step 1408, any information provided by the payor 110 is checked against information given to the payment enabler 170 by the payee 130.

In step 1412, a check is made for the user to determine if multiple accounts are opened with the payment enabler 170. Under some circumstances, the user may be asked to reconcile the multitude of accounts. Various tokens presented by various payors 110 could be linked to the account. In step 1416, the user could be asked a challenge question, for example, the city of his or her birth or the maiden name of his or her mother. In step 1420, the various information gathered in the previous steps is analyzed. In step 1416, the fraud risk is scored. Certain scores that don't satisfy a threshold will result in denial of an account. Other risk scores just affect the cost to the payor 110 to for the payment enabler guaranteeing a particular transaction.

In some cases, a transfer involves the payment enabler 170 assuming some fraud risk. For example, a credit card could be used to funds a transaction. Some charges to a credit card can be reversed months after the original transaction. During the intervening period, the payee 130 may have been paid. The fees charged by the payment enabler 170 cover some of this fraud risk. The payment enabler 170 could charge fees related to this fraud risk and even deny some payors 110 that pose to great a risk.

Figure 15:
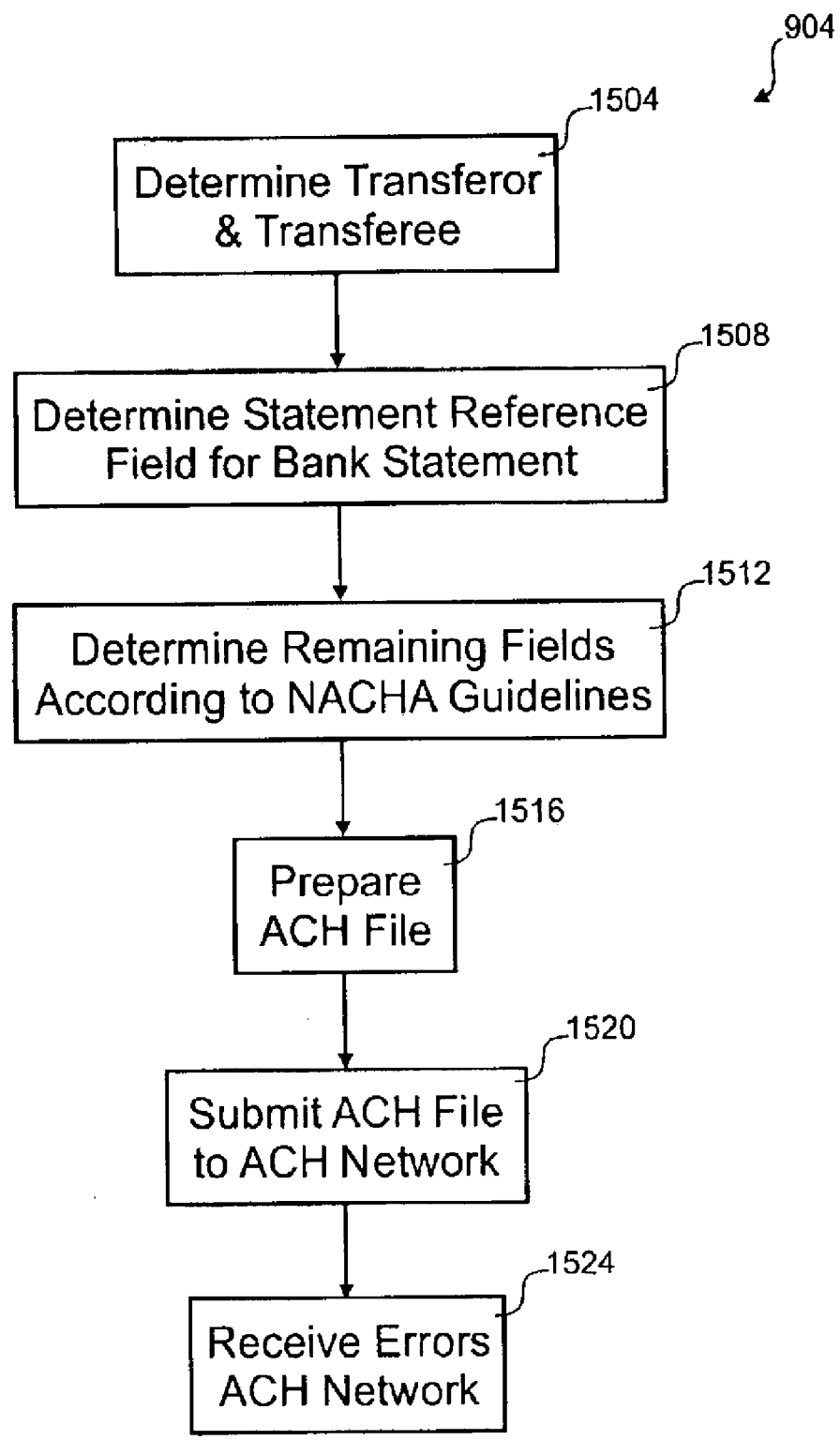
FIG. 15 is a flow diagram of an embodiment of a process for transferring money from the payor to the payee.

With reference to FIG. 15, a flow diagram of an embodiment of a process 904 for performing an ACH bank transfer is shown. The transaction passes funds directly from a first bank account of a payor 110 to a second bank account of the payee 130 without the need for intermediate accounts associated with the payment enabler 170. Similar processes could be used for other money handlers 160 that allow transfers without use of the payment enabler 170 as an intermediary. The depicted portion of the process 904 begins in step 1504 where the parties to the transfer are determined. In this embodiment a payor 110 is transferring funds to a payee 130. In step 1508, the statement reference field 720 is determined. This field 720 is passed to payor and payee banks for possible inclusion on the statement issued for the account. In this embodiment, the transfer is done directly from the payor bank account to the payee bank account, but other embodiments could use a stored value fund of the payee 130 in the middle of two transfers where the money handler 160 does not support direct transfers.

In step 1512, the remaining fields of the ACH file are determined according to the NACHA guidelines. The ACH file is prepared in step 1516 before submission to the ACH network in step 1520. Any initial errors are received from the ACH network 105 in step 1524 and processed to resolve issues that could interfere with the transfer of money. In this embodiment, the payment enabler 170 assumes less risk of non-payment such that any fees could be adjusted accordingly.

A number of variations and modifications of the invention can also be used. For example, the payment enabler could be used by any user to make payments or receive payments by interchanging the roles of payee and payor for a given transaction. Although some embodiments use a token that can be generated from the merchant identifier and the payee identifier, other embodiments could request a token from the payment enabler for each payee. Currently, the payment enabler only has to provide a merchant identifier that he payor can use to generate any number of tokens without consulting the payment enabler.

While the principles of the invention have been described above in connection with specific apparatuses and methods, it is to be clearly understood that this description is made only by way of example and not as limitation on the scope of the invention.

What is claimed is:

1. A method for transferring funds from a sender to one or more recipients using a wide-area computer network, the method comprising:

receiving transfer information from the sender with the wide area computer network to transfer credit to from the sender to a recipient, wherein:

the transfer information includes at least an identifier and a credit amount, the identifier is generated by the sender, and the identifier is unique to the recipient;

determining if the transfer information is complete;

sending a message to the recipient to request any missing transfer information, wherein the sending step comprises a step of providing electronic notification to the recipient that notifies the recipient that the transfer of funds is paused;

pausing transfer of a transfer amount related to the credit amount if the transfer information is incomplete;

receiving at least some information from the recipient to complete the transfer information; and completing transfer of the transfer amount after the transfer information is complete.

2. The method for transferring funds from the sender to one or more recipients using the wide-area computer network as recited in claim 1, further comprising steps of:

determining if the recipient is required to authenticate an identity of the recipient; and pausing transfer of the transfer amount based, at least in part, on the second-listed determining step.

3. The method for transferring funds from the sender to one or more recipients using the wide-area computer network as recited in claim 1, wherein the identifier comprises an e-mail address of the recipient.

4. The method for transferring funds from the sender to one or more recipients using the wide-area computer network as recited in claim 1, wherein the completing step comprises steps of:

determining a first handler chosen by the sender;

requesting at least the transfer amount from the first handler;

receiving at least the transfer amount from the first handler;

determining a second handler chosen by the recipient; and sending at least the transfer amount to the second handler associated with the recipient.

5. The method for transferring funds from the sender to one or more recipients using the wide-area computer network as recited in claim 4, wherein the first and second handlers include at least one of a bank, a credit card company, a debit card company, an agent location, a stored value fund, an airline mileage program, a gift certificate issuer, an electronic gift certificate issuer, or a money order issuer.

6. The method for transferring funds from the sender to one or more recipients using the wide-area computer network as recited in claim 1, wherein the completing transfer step comprises a step of transferring the transfer amount in a single transfer between a first account associated the sender and a second account associated with the recipient.

7. The method for transferring funds from the sender to one or more recipients using the wide-area computer network as recited in claim 1, wherein:

the identifier is related to a merchant identifier and a payee identifier, the merchant identifier is determined by someone or something other than the sender, and the payee identifier is determined by the sender.

8. The method for transferring funds from the sender to one or more recipients using the wide-area computer network as recited in claim 1, wherein the receiving step comprises automatically receiving a file comprising the transfer information.

9. The method for transferring funds from the sender to one or more recipients using the wide-area computer network as recited in claim 1, wherein the sending step comprises a step of sending a message using at least one of a web page, an instant message, an e-mail message, a pager message, a voice mail message, or a wireless phone message.

10. The method for transferring funds from the sender to one or more recipients using the wide-area computer network as recited in claim 1, wherein the credit amount corresponds to at least one of: currency, monetary value, coupon credit, airline mileage, promotional program points, gift certificate credit, or commodities.

11. The method for transferring funds from the sender to one or more recipients using the wide-area computer network as recited in claim 1, wherein the completing step comprises at least one of the following steps:

sending the transfer amount to a bank account;
sending the transfer amount to a credit card or debit card;
sending the transfer amount in a check or money order;
sending the transfer amount to an agent location;
sending the transfer amount in an electronic or a tangible gift certificate; or
sending the transfer amount to a promotional program.

12. The method for transferring funds from the sender to one or more recipients using the wide-area computer network as recited in claim 1, further comprising steps of:

receiving a trigger condition for a stored value fund of the recipient; and
automatically transferring at least the transfer amount from the stored value fund when the trigger condition is satisfied.

13. The method for transferring funds from the sender to one or more recipients using the wide-area computer network as recited in claim 12, wherein the trigger condition is selected from at least one of the following:

receipt of the transfer amount from a particular sender;
a credit balance in the stored value fund meeting a monetary threshold; or
detection of a time event.

14. A computer-readable medium having computer-executable instructions for performing the computer-implementable method for transferring funds from the sender to one or more recipients using the wide-area computer network, the computer-readable medium comprising code for:

receiving transfer information from the sender with the wide area computer network to transfer credit to from the sender to a recipient, wherein:
the transfer information includes at least an identifier and a credit amount,
the sender generates the identifier, and
the identifier is unique to the recipient;
determining if the transfer information is complete;
sending a message to the recipient to request any missing transfer information, wherein the sending step comprises a step of providing electronic notification to the recipient that notifies the recipient that the transfer of funds is paused;
pausing transfer of a transfer amount related to the credit amount if the transfer information is incomplete;
receiving at least some information from the recipient to complete the transfer information; and
completing transfer of the transfer amount after the transfer information is complete.

15. A method for transferring funds from a sender to a plurality recipients using a wide-area computer network, the method comprising:

receiving transfer information from the sender with the wide area computer network to transfer credit from the sender to a plurality of recipients, wherein the transfer information for one of the plurality of recipients includes at least a unique identifier and a credit amount;
determining if the one is required to authenticate an identity of the one;
sending a message to the one to request authentication the identity of the one, wherein the sending step comprises a step of providing electronic notification to the one that notifies the one that the transfer of funds is paused;
pausing transfer of a transfer amount related to the credit amount until the one authenticates the identity of the one;
authenticating the one; and
completing transfer of the transfer amount after any pause related to the pausing step.

16. The method for transferring funds from the sender to the plurality recipients using the wide-area computer network as recited in 15, further comprising steps of:

determining if the transfer information is complete for the one; and
pausing transfer of the transfer amount based, at least in part, on the second-listed determining step.

17. The method for transferring funds from the sender to the plurality recipients using the wide-area computer network as recited in 15, wherein the unique identifier is generated by the sender.

18. The method for transferring funds from the sender to the plurality recipients using the wide-area computer network as recited in 15, further comprising one or more of the following steps:

requiring the one have an account with a payment enabler; or
requiring the one provide a user name and password to authenticate the identity, whereby authentication allows access to the account of the one.

19. The method for transferring funds from the sender to the plurality recipients using the wide-area computer network as recited in 15, wherein:

the unique identifier is related to a merchant identifier and a payee identifier,
the merchant identifier is determined by someone or something other than the sender, and
the payee identifier is determined by the sender.

20. The method for transferring funds from the sender to the plurality recipients using the wide-area computer network as recited in 15, further comprising steps of:

receiving a trigger condition for a stored value fund of the one; and
automatically transferring at least the transfer amount from the stored value fund when the trigger condition is satisfied.

21. The method for transferring funds from the sender to the plurality recipients using the wide-area computer network as recited in 20, wherein the trigger condition is selected from at least one of the following:

receipt of the transfer amount from a particular sender;
a credit balance in the stored value fund meeting a monetary threshold; or
detection of a time event.

22. A method for transferring funds from a sender to a plurality recipients using a wide-area computer network, the method comprising:

receiving transfer information from the sender with the wide area computer network to transfer credit from the sender to a plurality of recipients, wherein the transfer information for one of the plurality of recipients includes at least an unique identifier and a credit amount;

determining if the transfer information is complete for one of the plurality of recipients;

determining if the one is required to authenticate an identity of the one;

electronically sending a message to the one to request at least one of any missing transfer information or authentication of the identity of the one;

pausing transfer of a transfer amount related to the credit amount until at least one of:

the transfer information is completed by the one, or the one authenticates the identity of the one;

completing transfer of the transfer amount after any pause related to the pausing step, wherein the completing step comprises at least one of a following six steps:

sending the transfer amount to a bank account, sending the transfer amount to a credit card or debit card, sending the transfer amount in a check or money order, sending the transfer amount to an agent location, sending the transfer amount in an electronic or a tangible gift certificate, or sending the transfer amount to a promotional program; and further comprising one or more of a following two steps:

requiring the one have an account with a payment enabler, or requiring the one provide a user name and password to authenticate the identity, whereby authentication allows access to the account of the one.

23. The method for transferring funds from the sender to the plurality recipients using the wide-area computer network as recited in 22, wherein the unique identifier is generated by the sender.

24. The method for transferring funds from the sender to the plurality recipients using the wide-area computer network as recited in 22, wherein:

the identifier is related to a merchant identifier and a payee identifier, the merchant identifier is determined by someone or something other than the sender, and the payee identifier is determined by the sender.

* * * * *